(12) United States Patent
Retterath

(10) Patent No.: US 10,298,908 B2
(45) Date of Patent: May 21, 2019

(54) VEHICLE DISPLAY SYSTEM FOR LOW VISIBILITY OBJECTS AND ADVERSE ENVIRONMENTAL CONDITIONS

(71) Applicant: 4D Intellectual Properties, LLC, Excelsior, MN (US)

(72) Inventor: James E. Retterath, Excelsior, MN (US)

(73) Assignee: 4D Intellectual Properties, LLC, Excelsior, MN (US)

( * ) Notice: Subject to any disclaimer, the term of this patent is extended or adjusted under 35 U.S.C. 154(b) by 0 days.

(21) Appl. No.: 15/853,222

(22) Filed: Dec. 22, 2017

(65) Prior Publication Data
US 2018/0295344 A1    Oct. 11, 2018

Related U.S. Application Data

(63) Continuation of application No. 15/059,811, filed on Mar. 3, 2016, now Pat. No. 9,866,816.

(51) Int. Cl.
*G01S 7/486*  (2006.01)
*H04N 5/232*  (2006.01)
(Continued)

(52) U.S. Cl.
CPC ......... *H04N 13/204* (2018.05); *G01S 7/4863* (2013.01); *G01S 17/107* (2013.01);
(Continued)

(58) Field of Classification Search
CPC .................................................... H04N 13/204
See application file for complete search history.

(56) References Cited

U.S. PATENT DOCUMENTS

| 3,971,065 A | 7/1976 | Bayer |
| 4,185,891 A | 1/1980 | Kaestner |
(Continued)

FOREIGN PATENT DOCUMENTS

| EP | 1764835 A1 | 3/2007 |
| EP | 1912078 A1 | 4/2008 |
(Continued)

OTHER PUBLICATIONS

Möller et al., "Robust 3D Measurement with PMD Sensors," Proceedings of the First Range Imaging Research Day at ETH Zurich, 2005, 14 pages.
(Continued)

*Primary Examiner* — Jayanti K Patel
*Assistant Examiner* — Irfan Habib
(74) *Attorney, Agent, or Firm* — Patterson Thuente Pedersen, P.A.

(57) ABSTRACT

A display system for use in a vehicle is disclosed including a camera configured to capture frames corresponding to a field of view. The camera is in communication with a processing unit configured to receive data representative of objects within the captured frames from the camera. A display is in communication with the processing unit which is configured to display objects based on the data representative of the captured frames received by the processing unit. Multi-frame capture is utilized with differential inter-frame illumination to provide low-visibility object detection and display. Adverse environmental conditions whereby image display is enhanced include fog, rain, snow, dust, nighttime, and high-glare scenarios.

18 Claims, 20 Drawing Sheets

US 10,298,908 B2

Page 2

(51) Int. Cl.
*H04N 13/204* (2018.01)
*H04N 13/257* (2018.01)
*H04N 13/271* (2018.01)
*H04N 13/296* (2018.01)
*G01S 17/10* (2006.01)
*G01S 17/89* (2006.01)
*G01S 17/93* (2006.01)

(52) U.S. Cl.
CPC ............ *G01S 17/89* (2013.01); *G01S 17/936* (2013.01); *H04N 5/232* (2013.01); *H04N 13/257* (2018.05); *H04N 13/271* (2018.05); *H04N 13/296* (2018.05); *H04N 2213/005* (2013.01)

(56) References Cited

U.S. PATENT DOCUMENTS

| | | |
|---|---|---|
| 4,739,398 A | 4/1988 | Thomas et al. |
| 4,935,616 A | 6/1990 | Scott |
| 5,006,721 A | 4/1991 | Cameron et al. |
| 5,026,156 A | 6/1991 | Bayston et al. |
| 5,054,911 A | 10/1991 | Ohishi et al. |
| 5,081,530 A | 1/1992 | Medina |
| 5,084,895 A | 1/1992 | Shimada et al. |
| 5,090,245 A | 2/1992 | Anderson |
| 5,122,796 A | 6/1992 | Beggs et al. |
| 5,212,706 A | 5/1993 | Jain |
| 5,400,350 A | 3/1995 | Galvanauskas |
| 5,418,359 A | 5/1995 | Juds et al. |
| 5,420,722 A | 5/1995 | Bielak |
| 5,446,529 A | 8/1995 | Stettner et al. |
| 5,465,142 A | 11/1995 | Krumes et al. |
| 5,485,009 A | 1/1996 | Meyzonnetie et al. |
| 5,497,269 A | 3/1996 | Gal |
| 5,619,317 A | 4/1997 | Oishi et al. |
| 5,675,326 A | 10/1997 | Juds et al. |
| 5,682,229 A | 10/1997 | Wangler |
| 5,793,491 A | 8/1998 | Wangler et al. |
| 5,805,275 A | 9/1998 | Taylor |
| 5,831,551 A | 11/1998 | Geduld |
| 5,870,180 A | 2/1999 | Wangler |
| 5,892,575 A | 4/1999 | Marino |
| 5,940,170 A | 8/1999 | Berg et al. |
| 6,054,927 A * | 4/2000 | Brickell ................ G01S 17/026 340/552 |
| 6,057,909 A | 5/2000 | Yahav et al. |
| 6,118,518 A | 9/2000 | Hobbs |
| 6,133,989 A | 10/2000 | Stettner et al. |
| 6,150,956 A | 11/2000 | Laufer |
| 6,181,463 B1 | 1/2001 | Galvanauskas et al. |
| 6,212,480 B1 | 4/2001 | Dunne |
| 6,323,942 B1 | 11/2001 | Bamji |
| 6,327,090 B1 | 12/2001 | Rando et al. |
| 6,370,291 B1 | 4/2002 | Mitchell |
| 6,373,557 B1 | 4/2002 | Megel et al. |
| 6,377,167 B1 | 4/2002 | Juds et al. |
| 6,396,397 B1 | 5/2002 | Bos et al. |
| 6,448,572 B1 | 9/2002 | Tennant et al. |
| 6,456,368 B2 | 9/2002 | Seo |
| 6,480,265 B2 | 11/2002 | Maimon et al. |
| 6,512,892 B1 | 1/2003 | Montgomery et al. |
| 6,522,396 B1 | 2/2003 | Halmos |
| 6,535,275 B2 | 3/2003 | McCaffrey et al. |
| 6,619,406 B1 | 9/2003 | Kacyra et al. |
| 6,646,725 B1 | 11/2003 | Eichinger et al. |
| 6,654,401 B2 | 11/2003 | Cavalheiro Vieira et al. |
| 6,665,055 B2 | 12/2003 | Ohishi et al. |
| 6,674,878 B2 * | 1/2004 | Retterath ................ G01N 21/55 340/907 |
| 6,683,727 B1 | 1/2004 | Göring et al. |
| 6,711,280 B2 | 3/2004 | Stafsudd et al. |
| 6,717,972 B2 | 4/2004 | Steinle et al. |
| 6,774,988 B2 | 8/2004 | Stam et al. |
| 6,828,558 B1 * | 12/2004 | Arnone ................ G01N 21/49 250/341.1 |
| 6,843,416 B2 | 1/2005 | Swartz et al. |
| 6,873,640 B2 | 3/2005 | Bradburn et al. |
| 6,881,979 B2 | 4/2005 | Starikov et al. |
| 6,906,302 B2 | 6/2005 | Drowley |
| 6,967,569 B2 | 11/2005 | Weber et al. |
| 6,975,251 B2 | 12/2005 | Pavicic |
| 6,987,447 B2 | 1/2006 | Baerenweiler et al. |
| 7,016,519 B1 | 3/2006 | Nakamura et al. |
| 7,148,974 B1 | 12/2006 | Schmitt et al. |
| 7,149,613 B2 | 12/2006 | Stam et al. |
| 7,171,037 B2 | 1/2007 | Mahon et al. |
| 7,224,384 B1 | 5/2007 | Iddan et al. |
| 7,227,459 B2 | 6/2007 | Bos et al. |
| 7,236,235 B2 | 6/2007 | Dimsdale |
| 7,248,342 B1 | 7/2007 | Degnan |
| 7,248,344 B2 | 7/2007 | Morcom |
| 7,294,863 B2 | 11/2007 | Lee et al. |
| 7,319,777 B2 | 1/2008 | Morcom |
| 7,348,919 B2 * | 3/2008 | Gounalis ................ G01S 7/021 342/13 |
| 7,362,419 B2 | 4/2008 | Kurihara et al. |
| 7,436,494 B1 | 10/2008 | Kennedy et al. |
| 7,453,553 B2 | 11/2008 | Dimsdale |
| 7,474,821 B2 | 1/2009 | Donlagic et al. |
| 7,521,666 B2 | 4/2009 | Tsang |
| 7,534,984 B2 | 5/2009 | Gleckler |
| 7,542,499 B2 | 6/2009 | Jikutani |
| 7,544,945 B2 | 6/2009 | Tan et al. |
| 7,551,771 B2 | 6/2009 | England, III |
| 7,560,680 B2 | 7/2009 | Sato et al. |
| 7,579,593 B2 * | 8/2009 | Onozawa ................ B60Q 1/0023 250/332 |
| 7,607,509 B2 | 10/2009 | Schmiz et al. |
| 7,623,248 B2 | 11/2009 | Laflamme |
| 7,649,654 B2 | 1/2010 | Shyu et al. |
| 7,663,095 B2 | 2/2010 | Wong et al. |
| 7,689,032 B2 | 3/2010 | Strassenburg-Kleciak |
| 7,697,119 B2 * | 4/2010 | Ikeno ................ G01S 7/493 356/4.01 |
| 7,733,932 B2 | 6/2010 | Faybishenko |
| 7,755,743 B2 | 7/2010 | Kumahara et al. |
| 7,755,809 B2 | 7/2010 | Fujita et al. |
| 7,787,105 B2 | 8/2010 | Hipp |
| 7,787,511 B2 | 8/2010 | Jikutani et al. |
| 7,830,442 B2 | 11/2010 | Griffis et al. |
| 7,830,532 B2 | 11/2010 | De Coi |
| 7,873,091 B2 | 1/2011 | Parent et al. |
| 7,881,355 B2 | 2/2011 | Sipes, Jr. |
| 7,888,159 B2 | 2/2011 | Venezia et al. |
| 7,894,725 B2 | 2/2011 | Holman et al. |
| 7,900,736 B2 | 3/2011 | Breed |
| 7,911,617 B2 | 3/2011 | Padmanabhan et al. |
| 7,940,825 B2 | 5/2011 | Jikutani |
| 7,944,548 B2 | 5/2011 | Eaton |
| 7,945,408 B2 | 5/2011 | Dimsdale et al. |
| 7,957,448 B2 | 6/2011 | Willemin et al. |
| 7,957,639 B2 | 6/2011 | Lee et al. |
| 7,960,195 B2 | 6/2011 | Maeda et al. |
| 7,961,328 B2 | 6/2011 | Austin et al. |
| 7,969,558 B2 | 6/2011 | Hall |
| 7,979,173 B2 | 7/2011 | Breed |
| 7,983,817 B2 | 7/2011 | Breed |
| 7,986,461 B2 | 7/2011 | Bartoschewski |
| 7,991,222 B2 | 8/2011 | Dimsdale et al. |
| 7,994,465 B1 | 8/2011 | Bamji et al. |
| 8,027,029 B2 | 9/2011 | Lu et al. |
| 8,045,595 B2 | 10/2011 | Ma |
| 8,054,203 B2 | 11/2011 | Breed et al. |
| 8,054,464 B2 | 11/2011 | Mathur et al. |
| 8,072,581 B1 | 12/2011 | Breiholz |
| 8,072,663 B2 | 12/2011 | O'Neill et al. |
| 8,077,294 B1 | 12/2011 | Grund et al. |
| 8,089,498 B2 | 1/2012 | Sato et al. |
| 8,094,060 B2 | 1/2012 | Beard et al. |
| 8,098,969 B2 | 1/2012 | Tolstikhin et al. |
| 8,102,426 B2 | 1/2012 | Yahav et al. |
| 8,111,452 B2 | 2/2012 | Butler et al. |

(56) References Cited

U.S. PATENT DOCUMENTS

| | | | |
|---|---|---|---|
| 8,115,158 B2 | 2/2012 | Buettgen | |
| 8,120,754 B2 | 2/2012 | Kaehler | |
| 8,125,367 B2 | 2/2012 | Ludwig | |
| 8,125,620 B2 | 2/2012 | Lewis | |
| 8,139,141 B2 | 3/2012 | Bamji et al. | |
| 8,159,598 B2 | 4/2012 | Watanabe et al. | |
| 8,194,712 B2 | 6/2012 | MÜller et al. | |
| 8,198,576 B2 | 6/2012 | Kennedy et al. | |
| 8,199,786 B2 | 6/2012 | Gaillard et al. | |
| 8,212,998 B2 | 7/2012 | Rindle | |
| 8,213,479 B2 | 7/2012 | Doerfel et al. | |
| 8,229,663 B2 | 7/2012 | Zeng et al. | |
| 8,235,416 B2 | 8/2012 | Breed et al. | |
| 8,235,605 B2 | 8/2012 | Kim | |
| 8,238,393 B2 | 8/2012 | Iwasaki | |
| 8,242,428 B2 | 8/2012 | Meyers et al. | |
| 8,242,476 B2 | 8/2012 | Memeault et al. | |
| 8,249,798 B2 | 8/2012 | Hawes et al. | |
| 8,259,003 B2 | 9/2012 | Song | |
| 8,280,623 B2 | 10/2012 | Trepagnier et al. | |
| 8,301,027 B2 | 10/2012 | Shaw et al. | |
| 8,310,654 B2 | 11/2012 | Weilkes et al. | |
| 8,319,949 B2 | 11/2012 | Cantin et al. | |
| 8,325,256 B2 | 12/2012 | Egawa | |
| 8,338,900 B2 | 12/2012 | Venezia et al. | |
| 8,340,151 B2 | 12/2012 | Liu et al. | |
| 8,354,928 B2 | 1/2013 | Morcom | |
| 8,355,117 B2 | 1/2013 | Niclass | |
| 8,363,156 B2 | 1/2013 | Lo | |
| 8,363,511 B2 | 1/2013 | Frank et al. | |
| 8,364,334 B2 | 1/2013 | Au et al. | |
| 8,368,005 B2 | 2/2013 | Wang et al. | |
| 8,368,876 B1 | 2/2013 | Johnson et al. | |
| 8,378,287 B2 | 2/2013 | Schemmann et al. | |
| 8,378,885 B2 | 2/2013 | Comic et al. | |
| 8,380,367 B2 | 2/2013 | Schultz et al. | |
| 8,391,336 B2 | 3/2013 | Chiskis | |
| 8,401,046 B2 | 3/2013 | Shveykin et al. | |
| 8,401,049 B2 | 3/2013 | Sato et al. | |
| 8,422,148 B2 | 4/2013 | Langer et al. | |
| 8,426,797 B2 * | 4/2013 | Aull | H04N 5/37455 250/214 R |
| 8,437,584 B2 | 5/2013 | Matsuoka et al. | |
| 8,442,084 B2 | 5/2013 | Ungar | |
| 8,446,470 B2 | 5/2013 | Lu et al. | |
| 8,451,432 B2 | 5/2013 | Crawford et al. | |
| 8,451,871 B2 | 5/2013 | Yankov | |
| 8,456,517 B2 | 6/2013 | Spektor et al. | |
| 8,477,819 B2 | 7/2013 | Kitamura | |
| 8,487,525 B2 | 7/2013 | Lee | |
| 8,494,687 B2 | 7/2013 | Vanek et al. | |
| 8,503,888 B2 | 8/2013 | Takemoto et al. | |
| 8,508,567 B2 | 8/2013 | Sato et al. | |
| 8,508,720 B2 | 8/2013 | Kamiyama | |
| 8,508,721 B2 | 8/2013 | Cates et al. | |
| 8,520,713 B2 | 8/2013 | Joseph | |
| 8,531,650 B2 | 9/2013 | Feldkhun et al. | |
| 8,538,636 B2 | 9/2013 | Breed | |
| 8,558,993 B2 | 10/2013 | Newbury et al. | |
| 8,570,372 B2 | 10/2013 | Russell | |
| 8,587,637 B1 | 11/2013 | Cryder et al. | |
| 8,594,455 B2 | 11/2013 | Meyers et al. | |
| 8,599,363 B2 * | 12/2013 | Zeng | G01B 11/002 356/3.01 |
| 8,599,367 B2 | 12/2013 | Canham | |
| 8,604,932 B2 | 12/2013 | Breed et al. | |
| 8,605,262 B2 | 12/2013 | Campbell et al. | |
| 8,619,241 B2 | 12/2013 | Mimeault | |
| 8,633,989 B2 | 1/2014 | Okuda | |
| 8,640,182 B2 | 1/2014 | Bedingfield, Sr. | |
| 8,655,513 B2 | 2/2014 | Vanek | |
| 8,675,184 B2 | 3/2014 | Schmitt et al. | |
| 8,681,255 B2 | 3/2014 | Katz et al. | |
| 8,687,172 B2 | 4/2014 | Faul et al. | |
| 8,717,417 B2 | 5/2014 | Sali et al. | |
| 8,717,492 B2 | 5/2014 | McMackin et al. | |
| 8,723,689 B2 | 5/2014 | Mimeault | |
| 8,724,671 B2 | 5/2014 | Moore | |
| 8,736,670 B2 | 5/2014 | Barbour et al. | |
| 8,736,818 B2 | 5/2014 | Weimer et al. | |
| 8,742,325 B1 | 6/2014 | Droz et al. | |
| 8,743,455 B2 * | 6/2014 | Gusev | H01S 5/042 359/344 |
| 8,754,829 B2 | 6/2014 | Lapstun | |
| 8,760,499 B2 | 6/2014 | Russell | |
| 8,767,190 B2 | 7/2014 | Hall | |
| 8,773,642 B2 | 7/2014 | Eisele et al. | |
| 8,781,790 B2 | 7/2014 | Zhu et al. | |
| 8,797,550 B2 | 8/2014 | Hays et al. | |
| 8,804,101 B2 | 8/2014 | Spagnolia et al. | |
| 8,809,758 B2 * | 8/2014 | Molnar | G02B 27/4205 250/208.1 |
| 8,810,647 B2 | 8/2014 | Niclass et al. | |
| 8,810,796 B2 * | 8/2014 | Hays | G01S 17/58 356/450 |
| 8,811,720 B2 | 8/2014 | Seida | |
| 8,820,782 B2 | 9/2014 | Breed et al. | |
| 8,836,921 B2 | 9/2014 | Feldkhun et al. | |
| 8,854,426 B2 | 10/2014 | Pellman et al. | |
| 8,855,849 B1 * | 10/2014 | Ferguson | G05D 1/00 701/28 |
| 8,864,655 B2 | 10/2014 | Ramamurthy et al. | |
| 8,885,152 B1 | 11/2014 | Wright | |
| 8,908,157 B2 | 12/2014 | Eisele et al. | |
| 8,908,159 B2 | 12/2014 | Mimeault | |
| 8,918,831 B2 | 12/2014 | Meuninck et al. | |
| 8,928,865 B2 | 1/2015 | Rakuljic | |
| 8,933,862 B2 | 1/2015 | Lapstun | |
| 8,934,087 B1 | 1/2015 | Stobie et al. | |
| 8,947,647 B2 | 2/2015 | Halmos et al. | |
| 8,963,956 B2 | 2/2015 | Latta et al. | |
| 8,988,754 B2 | 3/2015 | Sun et al. | |
| 8,995,577 B2 | 3/2015 | Ullrich et al. | |
| 9,032,470 B2 | 5/2015 | Meuninck et al. | |
| 9,066,087 B2 | 6/2015 | Shpunt | |
| 9,069,060 B1 * | 6/2015 | Zbrozek | G01S 7/481 |
| 9,098,931 B2 | 8/2015 | Shpunt et al. | |
| 9,102,220 B2 | 8/2015 | Breed | |
| 9,103,715 B1 * | 8/2015 | Demers | G01J 3/28 |
| 9,113,155 B2 | 8/2015 | Wu et al. | |
| 9,119,670 B2 | 9/2015 | Yang et al. | |
| 9,131,136 B2 | 9/2015 | Shpunt et al. | |
| 9,137,463 B2 | 9/2015 | Gilboa et al. | |
| 9,137,511 B1 | 9/2015 | LeGrand, III et al. | |
| 9,142,019 B2 | 9/2015 | Lee | |
| 9,158,375 B2 | 10/2015 | Maizels et al. | |
| 9,185,391 B1 | 11/2015 | Prechtl | |
| 9,186,046 B2 | 11/2015 | Ramamurthy et al. | |
| 9,186,047 B2 | 11/2015 | Ramamurthy et al. | |
| 9,191,582 B1 | 11/2015 | Wright et al. | |
| 9,201,501 B2 | 12/2015 | Maizels et al. | |
| 9,204,121 B1 | 12/2015 | Marason et al. | |
| 9,228,697 B2 | 1/2016 | Schneider et al. | |
| 9,237,333 B2 | 1/2016 | Lee et al. | |
| 9,239,264 B1 * | 1/2016 | Demers | G01J 3/108 |
| 9,360,554 B2 | 6/2016 | Retterath et al. | |
| 9,612,153 B2 * | 4/2017 | Kawada | G01J 1/44 |
| 9,723,233 B2 * | 8/2017 | Grauer | H04N 5/353 |
| 9,866,816 B2 | 1/2018 | Retterath | |
| 10,036,801 B2 | 7/2018 | Retterath et al. | |
| 2002/0179708 A1 | 12/2002 | Zhu et al. | |
| 2003/0043364 A1 | 3/2003 | Jamieson et al. | |
| 2003/0085867 A1 | 5/2003 | Grabert | |
| 2003/0155513 A1 * | 8/2003 | Remillard | G01S 7/484 250/341.8 |
| 2004/0133380 A1 * | 7/2004 | Gounalis | G01S 7/021 702/127 |
| 2006/0132752 A1 | 6/2006 | Kane | |
| 2006/0157643 A1 | 7/2006 | Bamji et al. | |
| 2006/0268265 A1 | 11/2006 | Chuang et al. | |
| 2006/0279630 A1 * | 12/2006 | Aggarwal | G01S 3/7864 348/143 |

(56) References Cited

U.S. PATENT DOCUMENTS

| | | | |
|---|---|---|---|
| 2007/0182949 A1* | 8/2007 | Niclass | G01O 3/08 356/3 |
| 2007/0279615 A1* | 12/2007 | Degnan | G01S 7/499 356/4.01 |
| 2008/0180650 A1 | 7/2008 | Lamesch | |
| 2009/0045359 A1 | 2/2009 | Kumahara et al. | |
| 2009/0076758 A1 | 3/2009 | Dimsdale | |
| 2009/0128802 A1* | 5/2009 | Treado | G01J 3/02 356/73 |
| 2009/0232355 A1* | 9/2009 | Minear | G06K 9/00201 382/103 |
| 2010/0020306 A1 | 1/2010 | Hall | |
| 2010/0045966 A1 | 2/2010 | Cauquy et al. | |
| 2010/0128109 A1 | 5/2010 | Banks | |
| 2010/0231891 A1 | 9/2010 | Mase et al. | |
| 2010/0265386 A1 | 10/2010 | Raskar et al. | |
| 2010/0277713 A1 | 11/2010 | Mimeault | |
| 2010/0301195 A1 | 12/2010 | Thor et al. | |
| 2011/0007299 A1 | 1/2011 | Moench et al. | |
| 2011/0037849 A1 | 2/2011 | Niclass et al. | |
| 2011/0101206 A1 | 5/2011 | Buettgen | |
| 2011/0131722 A1 | 6/2011 | Scott et al. | |
| 2011/0134220 A1 | 6/2011 | Barbour et al. | |
| 2011/0216304 A1 | 9/2011 | Hall | |
| 2011/0285980 A1 | 11/2011 | Newbury et al. | |
| 2011/0285981 A1* | 11/2011 | Justice | G01S 7/4813 356/4.01 |
| 2011/0285982 A1 | 11/2011 | Breed | |
| 2011/0295469 A1 | 12/2011 | Rafii et al. | |
| 2011/0313722 A1* | 12/2011 | Zhu | G01S 7/4802 702/159 |
| 2012/0001463 A1 | 1/2012 | Breed et al. | |
| 2012/0002007 A1 | 1/2012 | Meuninck et al. | |
| 2012/0002025 A1 | 1/2012 | Bedingfield, Sr. | |
| 2012/0011546 A1 | 1/2012 | Meuninck et al. | |
| 2012/0023518 A1 | 1/2012 | Meuninck et al. | |
| 2012/0023540 A1 | 1/2012 | Meuninck et al. | |
| 2012/0062705 A1 | 3/2012 | Ovsiannikov et al. | |
| 2012/0086781 A1 | 4/2012 | Iddan et al. | |
| 2012/0098964 A1 | 4/2012 | Oggier et al. | |
| 2012/0154784 A1 | 6/2012 | Kaufman et al. | |
| 2012/0154785 A1 | 6/2012 | Gilliland et al. | |
| 2012/0249998 A1 | 10/2012 | Eisele et al. | |
| 2012/0261516 A1* | 10/2012 | Gilliland | G01S 17/107 244/183 |
| 2012/0262696 A1 | 10/2012 | Eisele et al. | |
| 2012/0274745 A1 | 11/2012 | Russell | |
| 2012/0287417 A1 | 11/2012 | Mimeault | |
| 2012/0299344 A1 | 11/2012 | Breed et al. | |
| 2013/0044129 A1 | 2/2013 | Latta et al. | |
| 2013/0060146 A1 | 3/2013 | Yang et al. | |
| 2013/0070239 A1 | 3/2013 | Crawford et al. | |
| 2013/0076861 A1 | 3/2013 | Sternklar | |
| 2013/0083310 A1 | 4/2013 | Ramamurthy et al. | |
| 2013/0085330 A1 | 4/2013 | Ramamurthy et al. | |
| 2013/0085331 A1 | 4/2013 | Ramamurthy et al. | |
| 2013/0085333 A1 | 4/2013 | Ramamurthy et al. | |
| 2013/0085334 A1 | 4/2013 | Ramamurthy et al. | |
| 2013/0085382 A1 | 4/2013 | Ramamurthy et al. | |
| 2013/0085397 A1 | 4/2013 | Ramamurthy et al. | |
| 2013/0090528 A1 | 4/2013 | Ramamurthy et al. | |
| 2013/0090530 A1 | 4/2013 | Ramamurthy et al. | |
| 2013/0090552 A1 | 4/2013 | Ramamurthy et al. | |
| 2013/0100249 A1* | 4/2013 | Norita | G01B 11/245 348/46 |
| 2013/0188043 A1 | 7/2013 | Decoster | |
| 2013/0201288 A1 | 8/2013 | Billerbeck et al. | |
| 2013/0215235 A1 | 8/2013 | Russell | |
| 2013/0242283 A1 | 9/2013 | Bailey et al. | |
| 2013/0242285 A1 | 9/2013 | Zeng | |
| 2013/0278917 A1 | 10/2013 | Korekado et al. | |
| 2013/0300740 A1 | 11/2013 | Snyder et al. | |
| 2013/0300838 A1 | 11/2013 | Borowski | |
| 2013/0300840 A1 | 11/2013 | Borowski | |
| 2013/0321791 A1 | 12/2013 | Feldkhun et al. | |
| 2014/0035959 A1 | 2/2014 | Lapstun | |
| 2014/0152971 A1* | 6/2014 | James | G01S 17/89 356/4.01 |
| 2014/0152975 A1 | 6/2014 | Ko | |
| 2014/0160461 A1 | 6/2014 | Van Der Tempel et al. | |
| 2014/0168362 A1 | 6/2014 | Hannuksela et al. | |
| 2014/0211194 A1 | 7/2014 | Pacala et al. | |
| 2014/0218473 A1 | 8/2014 | Hannuksela et al. | |
| 2014/0240464 A1 | 8/2014 | Lee | |
| 2014/0240469 A1 | 8/2014 | Lee | |
| 2014/0240809 A1 | 8/2014 | Lapstun | |
| 2014/0241614 A1 | 8/2014 | Lee | |
| 2014/0253993 A1 | 9/2014 | Lapstun | |
| 2014/0292620 A1 | 10/2014 | Lapstun | |
| 2014/0313339 A1 | 10/2014 | Diessner | |
| 2014/0313376 A1 | 10/2014 | Van Nieuwenhove et al. | |
| 2014/0340487 A1 | 11/2014 | Gilliland et al. | |
| 2014/0347676 A1 | 11/2014 | Velten et al. | |
| 2014/0350836 A1 | 11/2014 | Stettner et al. | |
| 2015/0002734 A1 | 1/2015 | Lee | |
| 2015/0060673 A1 | 3/2015 | Zimdars | |
| 2015/0077764 A1 | 3/2015 | Braker et al. | |
| 2015/0082353 A1 | 3/2015 | Meuninck et al. | |
| 2015/0116528 A1 | 4/2015 | Lapstun | |
| 2015/0131080 A1* | 5/2015 | Retterath | G01S 17/10 356/5.01 |
| 2015/0145955 A1 | 5/2015 | Russell | |
| 2015/0192677 A1 | 7/2015 | Yu et al. | |
| 2015/0201176 A1 | 7/2015 | Graziosi et al. | |
| 2015/0213576 A1 | 7/2015 | Meuninck et al. | |
| 2015/0245017 A1* | 8/2015 | Di Censo | G02B 27/0101 348/51 |
| 2015/0256767 A1 | 9/2015 | Schlechter | |
| 2015/0269736 A1 | 9/2015 | Hannuksela et al. | |
| 2015/0292874 A1 | 10/2015 | Shpunt et al. | |
| 2015/0293226 A1 | 10/2015 | Eisele et al. | |
| 2015/0293228 A1 | 10/2015 | Retterath et al. | |
| 2015/0296201 A1 | 10/2015 | Banks | |
| 2015/0304534 A1 | 10/2015 | Kadambi et al. | |
| 2015/0304665 A1 | 10/2015 | Hannuksela et al. | |
| 2015/0309154 A1 | 10/2015 | Lohbihler | |
| 2015/0319344 A1 | 11/2015 | Lapstun | |
| 2015/0319355 A1 | 11/2015 | Lapstun | |
| 2015/0319419 A1 | 11/2015 | Akin et al. | |
| 2015/0319429 A1 | 11/2015 | Lapstun | |
| 2015/0319430 A1 | 11/2015 | Lapstun | |
| 2015/0378241 A1 | 12/2015 | Eldada | |
| 2015/0379362 A1 | 12/2015 | Calmes et al. | |
| 2016/0003946 A1 | 1/2016 | Gilliland et al. | |
| 2016/0007009 A1* | 1/2016 | Offenberg | H04N 13/254 348/46 |
| 2016/0047901 A1 | 2/2016 | Pacala et al. | |
| 2016/0049765 A1 | 2/2016 | Eldada | |
| 2016/0161600 A1 | 6/2016 | Eldada et al. | |
| 2016/0259038 A1 | 9/2016 | Retterath et al. | |
| 2016/0356881 A1 | 12/2016 | Retterath et al. | |
| 2017/0084176 A1* | 3/2017 | Nakamura | G06T 7/70 |
| 2017/0103271 A1* | 4/2017 | Kawagoe | B60Q 9/008 |
| 2017/0176578 A1* | 6/2017 | Rae | H01L 31/107 |
| 2017/0257617 A1* | 9/2017 | Retterath | G01S 17/107 |
| 2017/0259753 A1* | 9/2017 | Meyhofer | B60R 1/06 |
| 2018/0131924 A1* | 5/2018 | Jung | H04N 13/204 |

FOREIGN PATENT DOCUMENTS

| | | |
|---|---|---|
| WO | WO 1998/010255 A1 | 3/1998 |
| WO | WO 2013/081984 A1 | 6/2013 |
| WO | WO 2013/127975 A1 | 9/2013 |

OTHER PUBLICATIONS

Hussmann et al., "A Performance of 3D TOF Vision Systems in Comparison to Stereo Vision Systems," Stereo Vision, 2008, 20 pages.

Harvey-Lynch, Inc., "Multibeam and Mobile LIDAR Solutions," 2014, 2 pages.

(56) References Cited

OTHER PUBLICATIONS

Krill et al., "Multifunction Array LIDAR Network for Intruder Detection, Tracking, and Identification," IEEE ISSNIP, 2010, pp. 43-48.
Levinson et al., "Unsupervised Calibration for Multi-Beam Lasers," Stanford Artificial Intelligence Laboratory, 2010, 8 pages.
Webpage http://www.geforce.com/hardware/desktop-gpus/geforce-gtx-titan/specifications, Jul. 2015, 2 pages.
Webpage, 3D LADAR & LIDAR Focal Planes and Instruments, Voxtelopto, 2007-2015, 3 pages.
ASC 3D Bringing 3D Alive!, Advanced Scientific Concepts, Inc., Feb. 9, 2010, 14 pages.
Albota et al., "Three-Dimensional Imaging Laser Radar with a Photo-Counting Avalanch Photodiode Array and Microchip Laser," Dec. 20, 2002, 8 pages.
Brazzel et al., "FLASH LIDAR Based Relative Navigation," 2015 IEEE Aerospace Conference, 2014, 11 pages.
Love et al., "Active Probing of Cloud Multiple Scattering, Optical, Depth, Vertical Thickness, and Liquid Water Content Using Wide-Angle Imaging LIDAR," 2002, 11 pages.
Itzler, "Focal-Plane Arrays: Geiger-Mode Focal Plane Arrays Enable SWIR 3D Imaging," 2011, 8 pages.
Superior Signal-to-Noise Ratio of a New AA1 Sequence for Random-Modulation Continuous-Wave LIDAR, Optics Letters, 2004, vol. 29, No. 15.
Frequency-Modulated Continuous-Wave LIDAR Using I/Q Modulator for Simplified Heterodyne Detection, Optics Letters, 2012, vol. 37, No. 11.
Application No. PCT/US2015/022248, filed Mar. 24, 2015, Search Report/Written Opinion dated Jun. 26, 2015, 14 pages.
Application No. PCT/US2014/064123, filed Nov. 5, 2014, Search Report/Written Opinion dated Sep. 10, 2015, 14 pages.
Application No. PCT/US2016/018872, filed Feb. 22, 2016, Search Report/Written Opinion dated Nov. 15, 2016, 8 pages.
PCT/US2017/019852, Search Report/Written Opinion dated May 10, 2017, 10 pages.
Application and File history for U.S. Appl. No. 15/059,811, filed Mar. 3, 2016. Inventors: Retterath.
Application and File history for U.S. Appl. No. 14/078,001, filed Nov. 12, 2013. Inventors: Retterath et al.
Application and File history for U.S. Appl. No. 14/251,254, filed Apr. 11, 2014. Inventors: Retterath et al.
Application and File history for U.S. Appl. No. 15/173,969, filed Jun. 6, 2016. Inventors: Retterath et al.
Application and File history for U.S. Appl. No. 14/639,802, filed Mar. 5, 2015. Inventors: Retterath et al.

\* cited by examiner

FIG. 7

| Pulse # (t_n) | Emitter Pulse Start (t_x) | Emitter Pulse End (t_y) | Detector Pulse Start (t_a) | Detector Pulse End (t_b) | TOF Min. (t_x) | TOF Max. (t_y) | TOF Min (nSec) | TOF Max (nSec) | Minimum Dist. (m) | Maximum Dist. (m) | Intensity (Hex) |
|---|---|---|---|---|---|---|---|---|---|---|---|
| 0 | 0 | 4 | 0 | 6 | 0 | 6 | 0 | 75 | 0 | 22.5 | 0x28 |
| 1 | 8 | 12 | 9 | 15 | 1 | 7 | 12.5 | 87.5 | 3.75 | 26.25 | 0x28 |
| 2 | 17 | 21 | 19 | 25 | 2 | 8 | 25 | 100 | 7.5 | 30 | 0x28 |
| 3 | 27 | 31 | 30 | 36 | 3 | 9 | 37.5 | 112.5 | 11.25 | 33.75 | 0x5A |
| 4 | 38 | 42 | 42 | 48 | 4 | 10 | 50 | 125 | 15 | 37.5 | 0x8C |
| 5 | 50 | 54 | 55 | 61 | 5 | 11 | 62.5 | 137.5 | 18.75 | 41.25 | 0xBE |
| 6 | 63 | 67 | 69 | 75 | 6 | 12 | 75 | 150 | 22.5 | 45 | 0xF0 |
| 7 | 77 | 81 | 84 | 90 | 7 | 13 | 87.5 | 162.5 | 26.25 | 48.75 | 0xF0 |
| 8 | 92 | 96 | 100 | 106 | 8 | 14 | 100 | 175 | 30 | 52.5 | 0xF0 |
| 9 | 108 | 112 | 117 | 123 | 9 | 15 | 112.5 | 187.5 | 33.75 | 56.25 | 0xBE |
| 10 | 125 | 129 | 135 | 141 | 10 | 16 | 125 | 200 | 37.5 | 60 | 0x8C |
| 11 | 143 | 147 | 154 | 160 | 11 | 17 | 137.5 | 212.5 | 41.25 | 63.75 | 0x5A |
| 12 | 162 | 166 | 174 | 180 | 12 | 18 | 150 | 225 | 45 | 67.5 | 0x28 |
| 13 | 182 | 186 | 195 | 201 | 13 | 19 | 162.5 | 237.5 | 48.75 | 71.25 | 0x28 |
| 14 | 203 | 207 | 217 | 223 | 14 | 20 | 175 | 250 | 52.5 | 75 | 0x28 |
| 15 | 225 | 229 | 240 | 246 | 15 | 21 | 187.5 | 262.5 | 56.25 | 78.75 | 0x28 |

FIG. 9

| Stage # | Emitter Pulse Start($t_x$) | Emitter Pulse End ($t_x$) | Detector Pulse Start($t_x$) | Detector Pulse End($t_x$) | TOF Min. ($t_x$) | TOF Max. ($t_x$) | TOF Min (nSec) | TOF Max (nSec) | Minimum Dist. (m) | Maximum Dist. (m) | Blue Intensity (Hex) | Green Intensity (Hex) | Red Intensity (Hex) |
|---|---|---|---|---|---|---|---|---|---|---|---|---|---|
| 0 | 0 | 4 | 0 | 6 | 0 | 6 | 0 | 75 | 0 | 22.5 | 0x98 | 0x99 | 0x9A |
| 1 | 8 | 12 | 9 | 15 | 1 | 7 | 12.5 | 87.5 | 3.75 | 26.25 | 0x98 | 0x99 | 0x9A |
| 2 | 17 | 21 | 19 | 25 | 2 | 8 | 25 | 100 | 7.5 | 30 | 0x98 | 0x99 | 0x9B |
| 3 | 27 | 31 | 30 | 36 | 3 | 9 | 37.5 | 112.5 | 11.25 | 33.75 | 0x98 | 0x99 | 0x9B |
| 4 | 38 | 42 | 42 | 48 | 4 | 10 | 50 | 125 | 15 | 37.5 | 0x96 | 0x9A | 0x9C |
| 5 | 50 | 54 | 55 | 61 | 5 | 11 | 62.5 | 137.5 | 18.75 | 41.25 | 0x96 | 0x9A | 0x9C |
| 6 | 63 | 67 | 69 | 75 | 6 | 12 | 75 | 150 | 22.5 | 45 | 0x96 | 0x98 | 0x9A |
| 7 | 77 | 81 | 84 | 90 | 7 | 13 | 87.5 | 162.5 | 26.25 | 48.75 | 0x76 | 0x84 | 0x62 |
| 8 | 92 | 96 | 100 | 106 | 8 | 14 | 100 | 175 | 30 | 52.5 | 0x68 | 0x92 | 0x4C |
| 9 | 108 | 112 | 117 | 123 | 9 | 15 | 112.5 | 187.5 | 33.75 | 56.25 | 0x53 | 0x9D | 0x38 |
| 10 | 125 | 129 | 135 | 141 | 10 | 16 | 125 | 200 | 37.5 | 60 | 0x40 | 0x5D | 0x32 |
| 11 | 143 | 147 | 154 | 160 | 11 | 17 | 137.5 | 212.5 | 41.25 | 63.75 | 0x32 | 0x46 | 0x2B |
| 12 | 162 | 166 | 174 | 180 | 12 | 18 | 150 | 225 | 45 | 67.5 | 0x26 | 0x27 | 0x28 |
| 13 | 182 | 186 | 195 | 201 | 13 | 19 | 162.5 | 237.5 | 48.75 | 71.25 | 0x26 | 0x27 | 0x28 |
| 14 | 203 | 207 | 217 | 223 | 14 | 20 | 175 | 250 | 52.5 | 75 | 0x26 | 0x27 | 0x28 |
| 15 | 225 | 229 | 240 | 246 | 15 | 21 | 187.5 | 262.5 | 56.25 | 78.75 | 0x26 | 0x27 | 0x28 |

| Stage # | Emitter Pulse Start ($t_x$) | Emitter Pulse End ($t_x$) | Detector Pulse Start ($t_x$) | Detector Pulse End ($t_x$) | TOF Min. ($t_x$) | TOF Max. ($t_x$) | TOF Min (nSec) | TOF Max (nSec) | Minimum Dist. (m) | Maximum Dist. (m) |
|---|---|---|---|---|---|---|---|---|---|---|
| 0 | 0 | 0 | 4 | 0 | 6 | 0 | 6 | 0 | 75 | 0 | 22.5 |
| 1 | 8 | 13 | 9 | 16 | 1 | 8 | 12.5 | 100 | 3.75 | 30 |
| 2 | 18 | 24 | 20 | 28 | 2 | 10 | 25 | 125 | 7.5 | 37.5 |
| 3 | 30 | 37 | 33 | 42 | 3 | 12 | 37.5 | 150 | 11.25 | 45 |
| 4 | 44 | 52 | 48 | 58 | 4 | 14 | 50 | 175 | 15 | 52.5 |
| 5 | 60 | 69 | 65 | 76 | 5 | 16 | 62.5 | 200 | 18.75 | 60 |
| 6 | 78 | 88 | 84 | 96 | 6 | 18 | 75 | 225 | 22.5 | 67.5 |
| 7 | 98 | 109 | 105 | 118 | 7 | 20 | 87.5 | 250 | 26.25 | 75 |
| 8 | 120 | 132 | 128 | 142 | 8 | 22 | 100 | 275 | 30 | 82.5 |
| 9 | 144 | 204 | 145 | 221 | 1 | 77 | 12.5 | 962.5 | 3.75 | 288.75 |

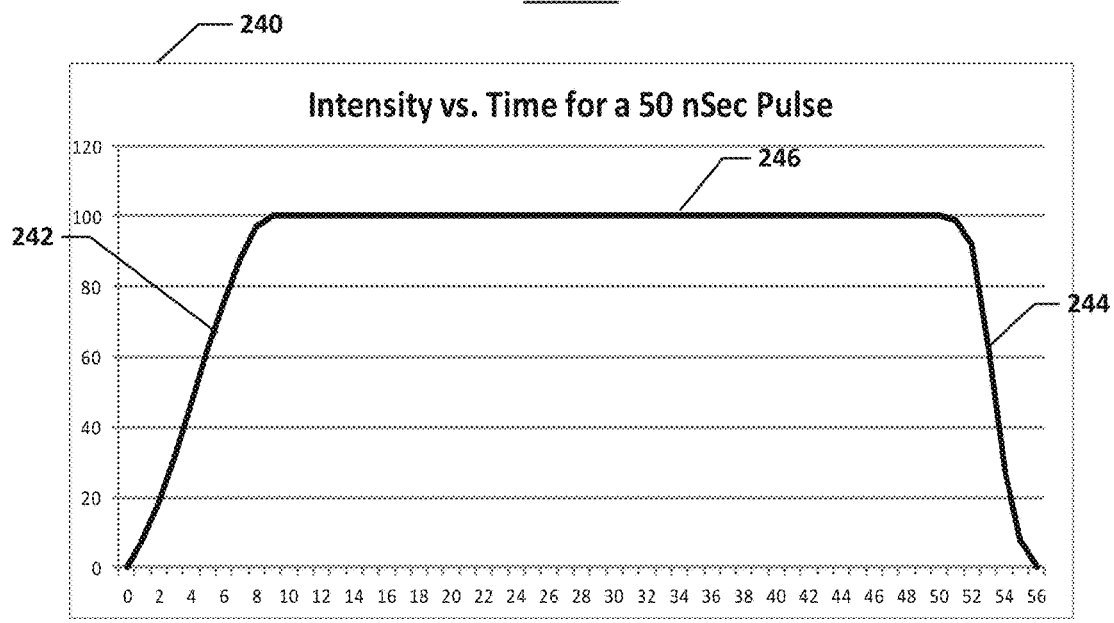
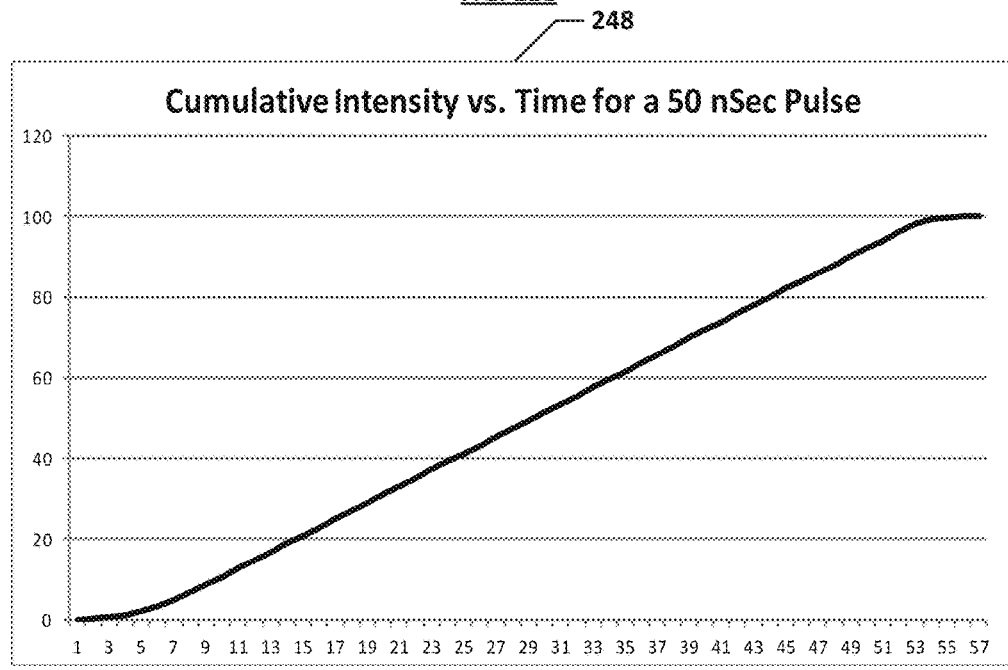

VEHICLE DISPLAY SYSTEM FOR LOW VISIBILITY OBJECTS AND ADVERSE ENVIRONMENTAL CONDITIONS

RELATED APPLICATION

This application is a continuation of application Ser. No. 15/059,811 filed Mar. 3, 2016, now U.S. Pat. No. 9,866,816 issued Jan. 9, 2018, which is hereby fully incorporated herein by reference.

TECHNICAL FIELD

Embodiments relate generally to cameras that provide measurements of distances to points in an image of a scene. More particularly, embodiments relate to an active light source camera whereby images of scenes and objects are acquired within a broad range of ambient lighting conditions, with each camera pixel providing color and distance information.

BACKGROUND

Three dimensional photonic imaging systems, also referred to as three-dimensional (3D) cameras, are capable of providing distance measurements and photonic measurements for physical objects in a scene. Applications for such 3D cameras are industrial inspection, selective robot vision, 3D modeling, geographic surveying, and forensic analysis.

3D cameras can be implemented with a variety of technologies, with each combination of technologies presenting certain limitations that render the cameras ineffective in broad-use applications. Stereo vision 3D cameras implement two or more imaging arrays in a fixed, highly-calibrated configuration and utilize triangulation of common points within the fields of view to establish distances to each of the common points. Stereo vision systems suffer from image distance inaccuracies due to occlusion and parallax. Furthermore, distance accuracies suffer when the baseline distance between image arrays is small relative to the distances being measured. Lastly, stereo 3D cameras are expensive due to the need for multiple image arrays and the requirement for high precision for the baseline offset between the image arrays.

Time-of-flight (TOF) systems utilize light sources, such as lasers, that are pulsed or modulated so they provide pulses of light for illuminating scenes in conjunction with an imaging system for measuring the amplitude and timing of the light reflected from the objects in the scene. Distances to points in the scene are determined using the known speed of light for all of the reflected signals. The imaging systems for TOF devices comprise a camera with a photodetector array, typically fabricated using CCD or CMOS technology, and a method for rapidly gating the collection times for the photodetector elements. Reflected light is captured by the photodetector elements during the specific gating cycles.

Some TOF systems only utilize the timing between light pulses and gated photodetectors to determine 3D object distances. Other TOF systems utilize the amount of received light during a gated capture cycle to establish object distances. The accuracy of these systems depends on the uniformity of incident light and the speed of the gating mechanism for the photodetectors.

Utilizing gated photodetectors is an effective method to establish distances to objects in a scene. By precisely controlling the timing between incident light pulses and gated photodetectors the distances to objects in certain distance bands can be accurately determined. For establishing object distances for other distance bands, subsequent light and gated photodetector cycles are utilized while the stationary objects and stationary camera are maintained in their present configurations and orientations. Any movement of the camera and/or objects in the scene will result in distance measurement bands that are not registered with one another.

A 3D camera described in U.S. Pat. No. 4,935,616 utilizes a modulated source and imaging system. A preferred embodiment of this system uses a CW laser and utilizes the phase difference between the incident and reflected signals to establish the distances to objects.

Another 3D camera is described in U.S. Pat. No. 5,081,530. This system utilizes a pair of gates for each photodetector element. Distances to objects are determined from the ratio of differences between the sampled energy at the two gated elements.

U.S. Pat. Nos. 7,362,419 and 7,755,743 each utilize modulated light intensity sources and phase ranges to detect phase shifts between emitted and detected signals. An embodiment of U.S. Pat. No. 8,159,598 utilizes modulated light intensity and phase shift detection for time of flight determination. Other embodiments of U.S. Pat. No. 8,159,598 utilize a high resolution color path with a low resolution distance path to determine 3D information for a detector or a group of detectors.

U.S. Pat. No. 8,102,426 to Yahav describes 3D vision on a chip and utilizes an array of photodetector elements that are gated at operative times to establish object distances in a scene. Photodetector sites are utilized for either TOF distance measurement or for the determination of object color. Embodiments of Yahav describe utilizing groups or bands of photodetector elements to establish the various distance bands. Other embodiments of Yahav describe a single distance band for each capture cycle, with full scene distances established utilizing sequences of capture cycles. Although not specified in Yahav, the requirement for the embodiments is no movement of the camera and the objects in the scene throughout the sequence of capture cycles.

For real-world applications like autonomous vehicle navigation, mobile mapping, agriculture, mining, and surveillance it is not practical to require little or no relative movement between a 3D camera and objects in a scene during a sequence of imaging cycles. Furthermore, most of the real-world situations occur in scenes that have widely-varying ambient light conditions. It is desirable to have a 3D camera that captures images at a sufficient rate to accurately measure objects in transient scenes where the objects, camera or both are in motion. Furthermore, it is desirable to have an active-light-source 3D camera that produces accurate distances and colors for daytime and nighttime imaging. Furthermore, it is desirable to have a camera that can "see through" atmospheric conditions that dramatically limit the visibility of two-dimensional cameras.

SUMMARY

In embodiments, a photodetector array of a four dimensional (4D) camera captures reflected light from a scene utilizing a rapid sequence of active light pulses and gated photodetector cycles, with differentiated relative timing between the successive light pulses and the corresponding gated detector cycles.

In embodiments, the incident light is full spectrum visible light in the energy band from roughly 400 nanometers to 700 nanometers. The photodetector sites are sensitive to radiation in this wavelength band. In embodiments the photodetectors utilize a bandpass filter to reduce or eliminate radiation outside the desired energy band. The bandpass filter(s) can be applied as a global array filter in the case of an IR-eliminating filter and can be applied as an individual filter for each photodetector in the case of a Bayer pattern for establishing RGB elements in the array.

In some embodiments, a photodetector element utilizes a photodiode coupled to a photodetector integration element whereby the current from the photodiode produces a charge that is collected or integrated during the gating cycle of the photodetector. The photodetector integration stage is emptied by rapidly transferring the integrated charge to the next processing element in the system, thus allowing the photodetector stage to begin the integration for the subsequent photodetector integration cycle.

In embodiments, each photodetector site in the array is connected to a dedicated charge transfer stage wherein each of the K stages facilitates the rapid transfer of charges from the photodetector site. Utilizing K charge transfer stages per photodetector allows for up to K gated emitter/detector cycles per imaging cycle.

In embodiments, the detector array and charge transfer sites are fabricated together on a focal plane array along with gating circuitry and charge transfer control circuitry. The number of photodetector sites will be sufficiently large and the focal plane array interface to the downstream camera circuitry will be of a relatively lower throughput rate than that of the throughput of the higher-speed charge transfer array.

In embodiments, the detector array is fabricated on a focal plane array along with gating circuitry. The signal interface for the focal plane array is sufficiently fast that the integrated charges can be transferred from the integration sites directly to a 4D frame buffer without the need for a charge transfer array.

In some embodiments, the 4D camera light source comprises one or more elements like LEDs that provide uniform intensity throughout the desired frequency range. In other embodiments, the light source is a combination of light elements like LEDs wherein the frequency responses on the separate light elements combine to form an output signal that is uniform throughout the desired frequency range.

In embodiments, the camera detects environmental conditions that attenuate emitted and reflected signals and utilizes detected information from environmental and ambient signals to establish non-attenuated signal strength, object distances and object color.

In embodiments, the light intensity is non-uniform throughout the frequency range. The non-uniform light is characterized to establish parameters for use in color correction applied during image post-processing. In embodiments the light intensity is spatially non-uniform throughout the field of view. The non-uniform spatial intensity is mapped to allow for scene intensity and color adjustments during image post-processing.

In some embodiments, the light energy is emitted and received as common laser wavelengths of 650 nm, 905 nm or 1550 nm. In some embodiments the light energy can be in the wavelength ranges of ultraviolet (UV)—100-400 nm, visible—400-700 nm, near infrared (NIR)—700-1400 nm, infrared (IR)—1400-8000 nm, long-wavelength IR (LWIR)—8 um-15 um, far IR (FIR)—15 um-1000 um, or terahertz—0.1 mm-1 mm.

BRIEF DESCRIPTION OF THE DRAWINGS

FIG. 7 illustrates TOF ranges for a typical 16-stage detector pixel and shows the associated collected intensity values for all integration stages.

FIG. 9 illustrates TOF ranges and intensity values for imaging with fog obscuring an optical path.

FIG. 11 illustrates TOF ranges for a ten-stage detector pixel and shows associated collected intensity values for all integration stages.

FIG. 12a illustrates an optical timing diagram for a 50 nSec emitter pulse.

FIG. 12b illustrates an optical timing diagram for cumulative intensity of the same 50 nSec emitter pulse.

DETAILED DESCRIPTION OF THE DRAWINGS

Figure 1:
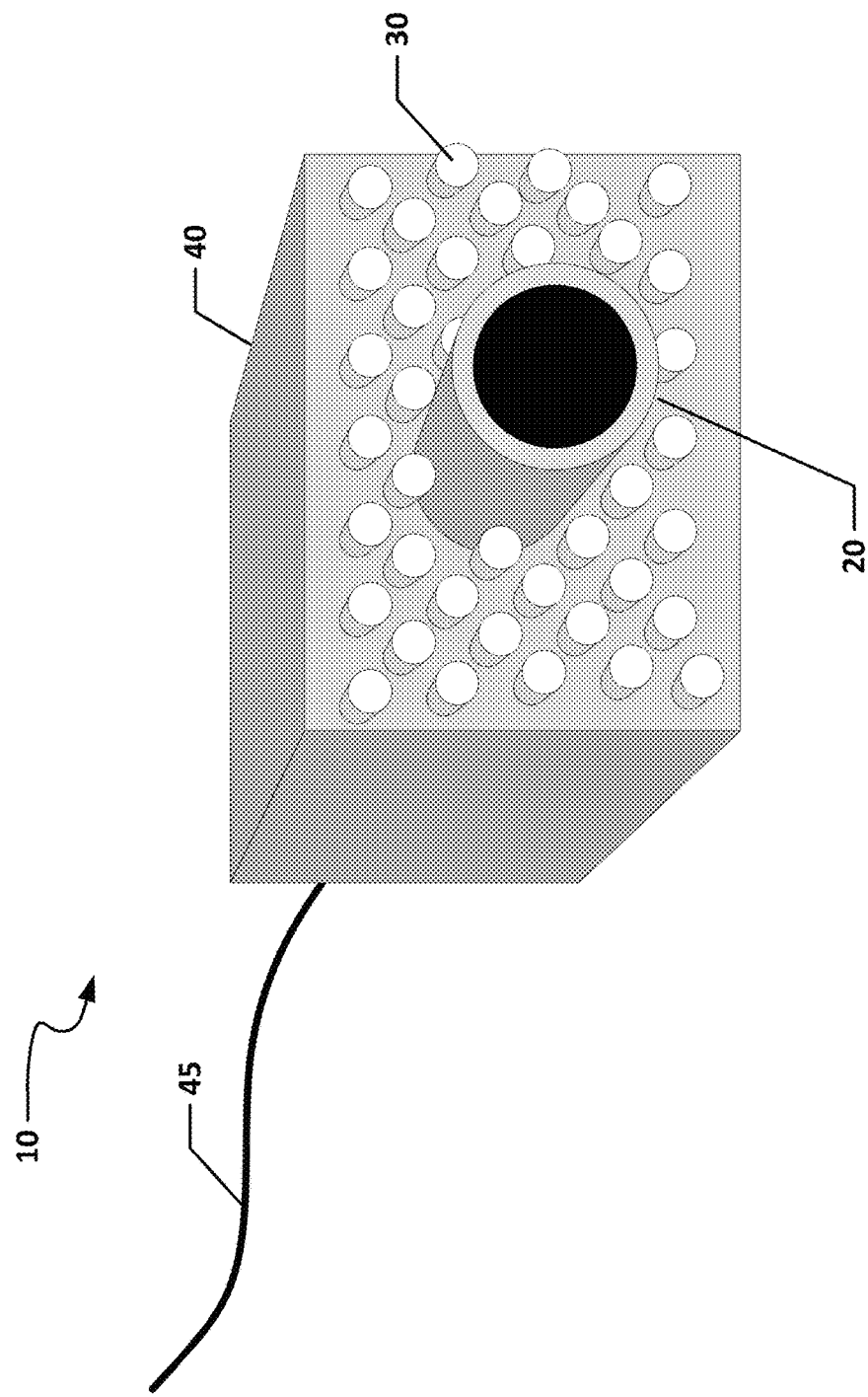
FIG. 1 illustrates an external view of a 4D camera configuration.

FIG. 1 shows a mechanical configuration for a 4D camera 10. The lens 20 comprises one or more transparent optical elements that guide and focus light from the field of view (FOV) onto a detector array. Bandpass filters are typically included as part of the lens 20 assembly to filter out unwanted frequency components. For example, a 4D camera 10 that utilizes 905 nm lasers for emitters may include a narrow bandpass filter at 905 nm in order to exclude visible spectrum and other IR frequencies from energizing the detector elements. Emitters 30 provide incident light that is distributed over an area that includes the FOV of the detector array and associated lens 10. Light originating from emitters 30 is "active" light in that it can be distinguished from "passive" ambient light. Individual emitters 30 may be lensed to properly distribute light throughout the FOV. All emitters 30 may generate the same frequencies as each other or separate emitters 30 may generate different bands of a desired spectral output of a device 10. Pulsing of the emitters 30 is precisely controlled by electronics on board the 4D camera 10. Mechanical housing 40 for the camera 10 will typically have device mounting features to allow for precise orientation of a camera 10 to a device or vehicle to which it is attached. Power is supplied to 4D camera 10 via a power connection 45. Information is transferred to/from camera 10 either via an integrated power/communication cable 45, via a separate I/O cable, or via a wireless interface.

Figure 2:
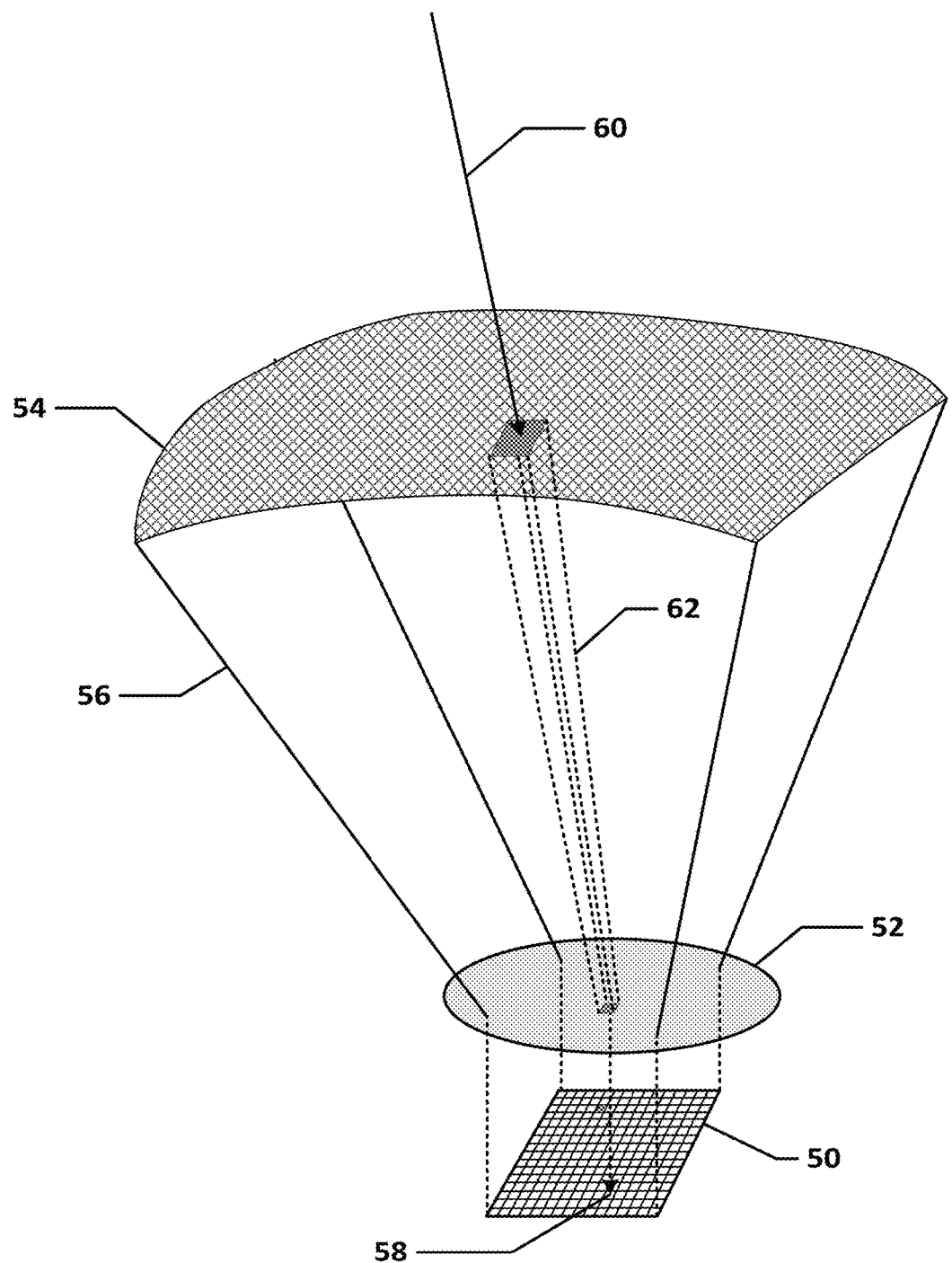
FIG. 2 illustrates aspects of a 4D camera that define a system's field of view.

FIG. 2 shows an optical configuration of an embodiment for a detector array 50. A lens 52 or other optics determines a field of view 56 of a detector array 50. The edges of a detector array 50 field of view 56 are defined by angular extents from the normal vector of the device. This same normal vector will serve as a reference vector for subsequent angular measurements for detected objects. A surface 54 shown is a portrayal of a detector array 50 field of view at a constant distance from an array 50. In various embodiments, each detector element 58 in an array 50 may be associated with a different angle 60 within a field of view 56. An individual detector's 58 field of view 62 will be a subset of a detector array's 50 field of view 56. Said another way, a detector array 50 field of view 56 is the summation of all of the individual fields of view 62.

For a detector array 50 with an in-focus lens 52 the individual fields of view 62 corresponding to each detector 58 should perfectly align with the fields of view for neighboring detectors. In practice, a lens 52 will almost never be perfectly in focus. Thus, the fields of view 62 of each detector 58 in a lensed system may typically overlap, though the field of view of each detector 58 is different from that of any other detector 58 in the detector array 50. Detector arrays 50 may not have optimal density in their configuration due to semiconductor layout limitations, substrate heat considerations, electrical crosstalk avoidance, or other layout, manufacturing, or yield constraints. As such, sparse detector arrays 50 may experience loss in photon detector efficiency within the device field of view 56 due to reflected photons contacting the unutilized spaces between successive detector elements 58.

For non-lensed systems the field of view 62 of each detector 58 can be determined by a diffraction grating, an interferometer, a waveguide, a 2D mask, a 3D mask, or a variety of other aperture configurations designed to allow light within a specific field of view. These individual detector apertures will typically have overlapping fields of view 62 within the device field of view 56.

An element of various embodiments is the determination of an angle 60 for each detector 58. FIG. 2 shows a detector array 50 with a single lens 52. Another embodiment utilizes micro lenses at each detector element 58 wherein the individual micro lenses are configured to transmit reflected light at various angles throughout the device's field of view 56. Another embodiment utilizes detector elements 58 with waveguides at various angles throughout the device's field of view. Other embodiments utilize detector elements with apertures created from interferometers, diffraction gratings, 2D masks, 3D masks, or other aperture-forming structures to create waveguide properties at various angles throughout the device's field of view. For a single-lens 52 system like that of FIG. 2 with a lens 52 configured to transmit in-focus light to the array 50, the individual fields of view 62 are essentially adjacent to the fields of view of the neighboring detectors 58 in the array 50. Out-of-focus lenses 52 will produce overlapping fields of view 62 for individual detectors 58. Waveguide and aperture detectors will likely produce overlapping fields of view 62 for individual detectors 58. Micro lenses will also likely produce overlapping fields of view 62 for the individual detectors 58. All of these overlapping field-of-view embodiments produce reliable results according to the specifications herein. The features of the optical detection system of these embodiments are that multiple detector elements comprise a device's field of view 56, and every element in the detector array is defined by the angle 60 that determines the detector 58 field of view 62.

Variations will occur in the fabrication of detector arrays 50 used in 4D cameras. In single-lens 52 detector array devices like that shown in FIG. 2, miniscule differences in the alignment of the array 50 and the lens 52 can cause differences in the detector angles between separate devices. Because of the minor fabrication and assembly differences between devices, each device may undergo a post-production characterization process. The characterization process defines the central angle 60 for each as-constructed detector element. In various embodiments, characterization data from this process is stored in non-volatile memory or in a configuration file for every device. Waveguide, micro lens and aperture devices may require similar characterization to establish angles 60 for each detector element.

Due to the importance of accurate determination of the optical path, in situ calibration may be desirable for devices according to various embodiments. As an example, a 4D camera device according to an embodiment may be used as a sensor in an autonomous vehicle. In order to protect the device it may be mounted inside a passenger vehicle affixed to the windshield behind the rear-view mirror. Since the device is facing in front of a vehicle, emitted light and reflected light will pass through the windshield on its way to and from external objects. Both components of light will undergo distortion when passing through the windshield due to reflection, refraction, and attenuation. In situ calibration for this autonomous vehicle 4D camera may include the device emitting pre-determined calibration patterns and measuring the intensity, location, and angle of the reflected signals. Device characterization parameters would be updated to account for a modified optical path of the incident and/or reflected light based on a calibration.

Figure 3:
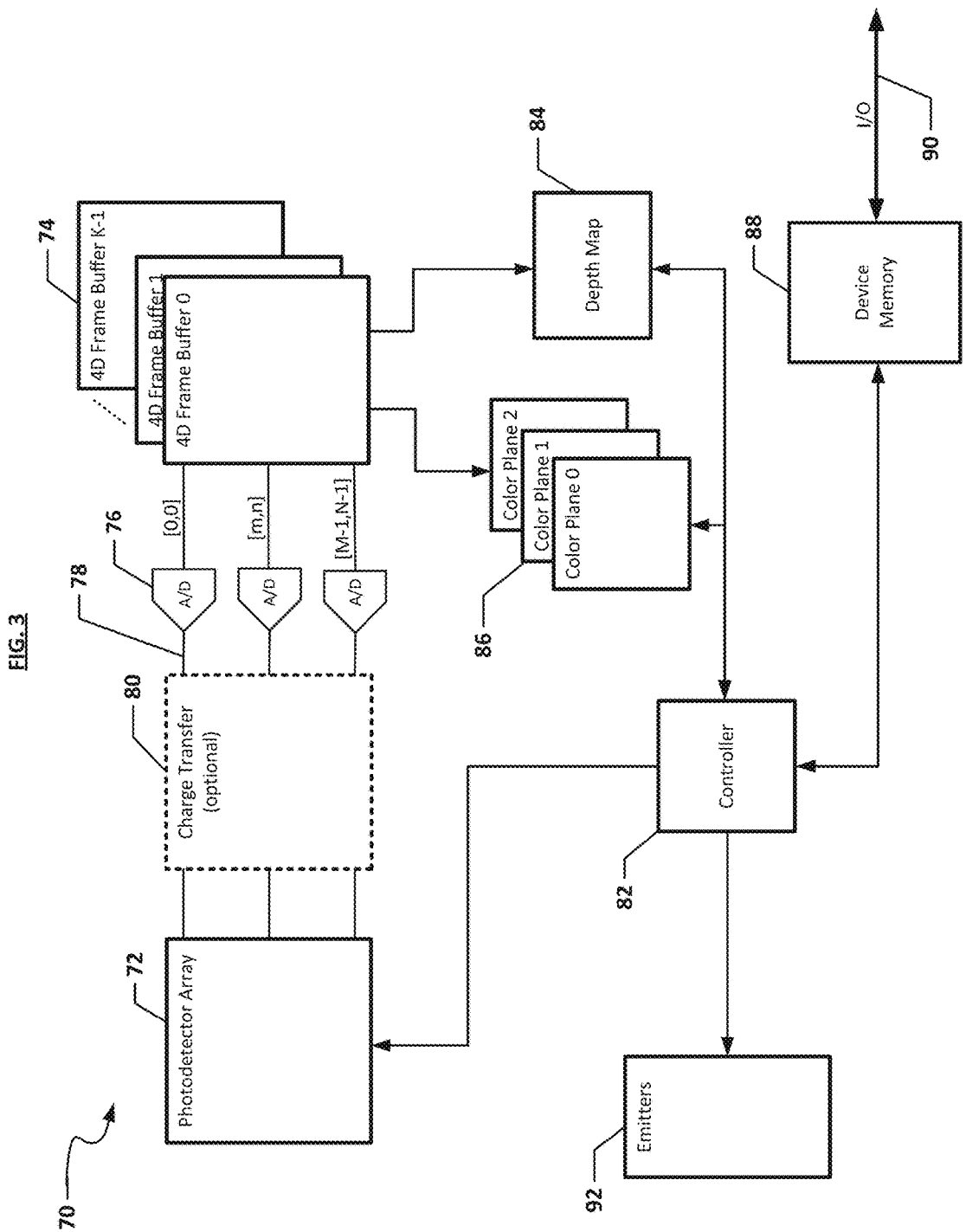
FIG. 3 illustrates a functional block diagram of the main electrical and optical elements of a system.

FIG. 3 shows a functional block diagram for an embodiment with electrical and optical elements for a 4D camera 70. The photodetector array 72 is a configuration of M rows by N columns of elements that sense photons at certain frequencies and convert optical energy to electrical information. An image capture cycle for the 4D camera 70 will consist of K successive emitter/detector cycles produced in a rapid sequence, with the relative timing varied for each of the K successive cycles to account for different TOFs and thus different distance range bands for the capture cycles. The information from the photodetector array 72 is stored in the 4D frame buffer memory 74. There are K frame buffers in the 4D frame buffer memory 74, with each of the K frame buffers corresponding to detector information collected for the M×N detectors 72 for each emitter/detector cycle. Information from the photodetectors 72 is typically collected and integrated in analog signal form. A/D converters 76 translate the detector 72 information to digital format prior to storage in the digital-information 4D frame buffers 74. Each of the K 4D frame buffers 74 will have M×N×L bits, where M is the number of rows in the detector array 72, N is the number of columns in the detector array 72, and L is the number of bits per pixel produced by each A/D converter 76. The number of A/D converter elements 76 in embodiments can range from 1 to M×N. More A/D converter elements 76 allow for faster transfer or information from a photodetector array 72 to a 4D frame buffer 74.

In embodiments a photodetector array 72 is fabricated as a focal plane array that utilizes electrical connections 78 to interface with other camera 70 circuitry. This electrical interface 78 is typically of lower bandwidth than that required by the high-speed photodetection elements 72. The charge transfer array 80 is a collection of fast analog storage elements that takes information from the photodetector array 72 at a rate sufficient to allow the photodetector elements 72 to rapidly process subsequent emitter/detector events. The size of the charge transfer array 80 is typically M×N×K analog storage elements where M is the number of rows in the detector array 72, N is the number of columns in the detector array 72, and K is the number of emitter/detector cycles that constitute a 4D capture cycle for a single 4D camera 70 event.

Information from a 4D frame buffer 74 is processed separately for color information and distance information. A controller 82 computes distance values from the TOF algorithm for each of the M×N pixels and stores the distance information in the depth map 84 memory. In embodiments a photodetector array 72 is fabricated with a color filter pattern like a Bayer pattern or some other red-green-blue (RGB) configuration. Each color from a detector filter pattern will require a corresponding color plane 86 in device 70 memory. FIG. 3 shows color planes 0 through 2 86 corresponding to, for example, red, green and blue planes of a detector array with a Bayer filter pattern. The number of color planes 86 can be one for monochrome, grey scale, or single-frequency applications and for IR and NIR applications. The number of color planes 86 is denoted as C and corresponds to the number of different bandpass filters utilized in the optical path of the detector array 72 or corresponds to the number of separate emitter frequencies that are utilized in a single-detector filtered, multi-emitter-wavelength configuration. Each of the C color planes 86 contains M×N elements, each with L bits of information. For embodiments with multi-colored detector filters a controller 82 may perform demosaicing on each of the C color planes 86 to create a dense color map from the sparse maps produced by the detector filter pattern.

A controller 82 will assemble separate color planes 86 into an output image format and store a resulting file in device memory 88. An output file may be in a format such as TIFF, JPEG, BMP or any other industry-standard or other proprietary format. Depth map 84 information for an image may be stored in the image file or may be produced in a separate file that is associated with the image file. After completion of the creation of the output file(s) the controller 82 transmits information via the I/O 90 interface to an upstream application or device. A controller 82 configures all of the sequencing control information for the emitters 92, the photodetector 72 integration, the 4D frame buffer 74 transformation to color 86 and depth 84 information, and device 70 communication to other devices. A controller 82 can be a single CPU element or can be a collection of microcontrollers and/or graphics processing units (GPUs) that carry out the various control functions for the device 70.

Figure 4:
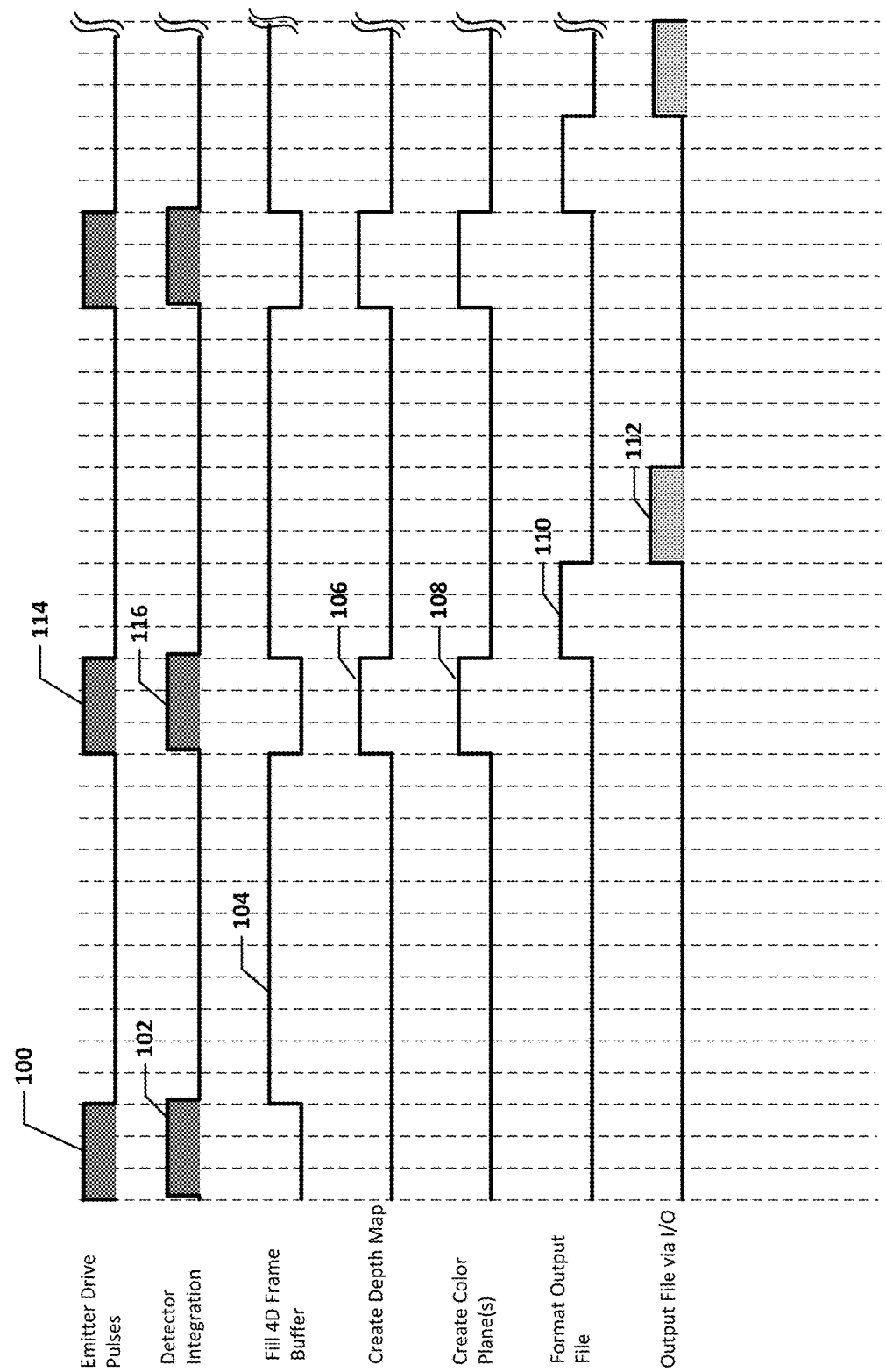
FIG. 4 illustrates an electrical timing diagram showing multiple 4D image capture and processing cycles.

FIG. 4 shows electrical signal timing for multiple image capture cycles. During the first sequence of emitter drive pulses 100 there are K pulses that energize the camera emitters. At select times following the start of the emitter drive pulses, K detector integration 102 cycles are performed. Upon completion of the last detector integration cycle 102 the information is transferred from a detector array or charge transfer array to a 4D frame buffer 104. The time to transfer the M×N×K intensity values from a detector array or charge transfer array to a 4D frame buffer is typically much longer than the time for emitter/detector cycles 100, 102.

Upon completion of the filling of a 4D frame buffer a camera controller will create an M×N depth map 106 and will create the color plane(s) 108. In embodiments where a camera utilizes multiple color planes produced by multiple color filters on a detector array a controller performs demosaicing for each of the sparse color planes to produce M×N color values for each color plane. A controller creates an output file for the present color image and will format 110 the file for transmission to the upstream device or application.

The frame rate of a 4D camera will typically be a function of the longest action in the processing sequence. For the FIG. 4 embodiment the filling of the 4D frame buffer 104 is the longest action due to typical bandwidth constraints of focal plane array architecture. When the 4D frame buffer is emptied a new emitter/detector cycle can begin. Emitter drive pulses 114 and detector integration cycles 116 for a second 4D camera frame cycle are shown commencing while the depth 106 and color plane(s) 108 are created for the previous camera cycle. This pipelining of computation cycles is a technique known in the art for increasing the throughput of a normally serial sequence of computing events.

Figure 5:
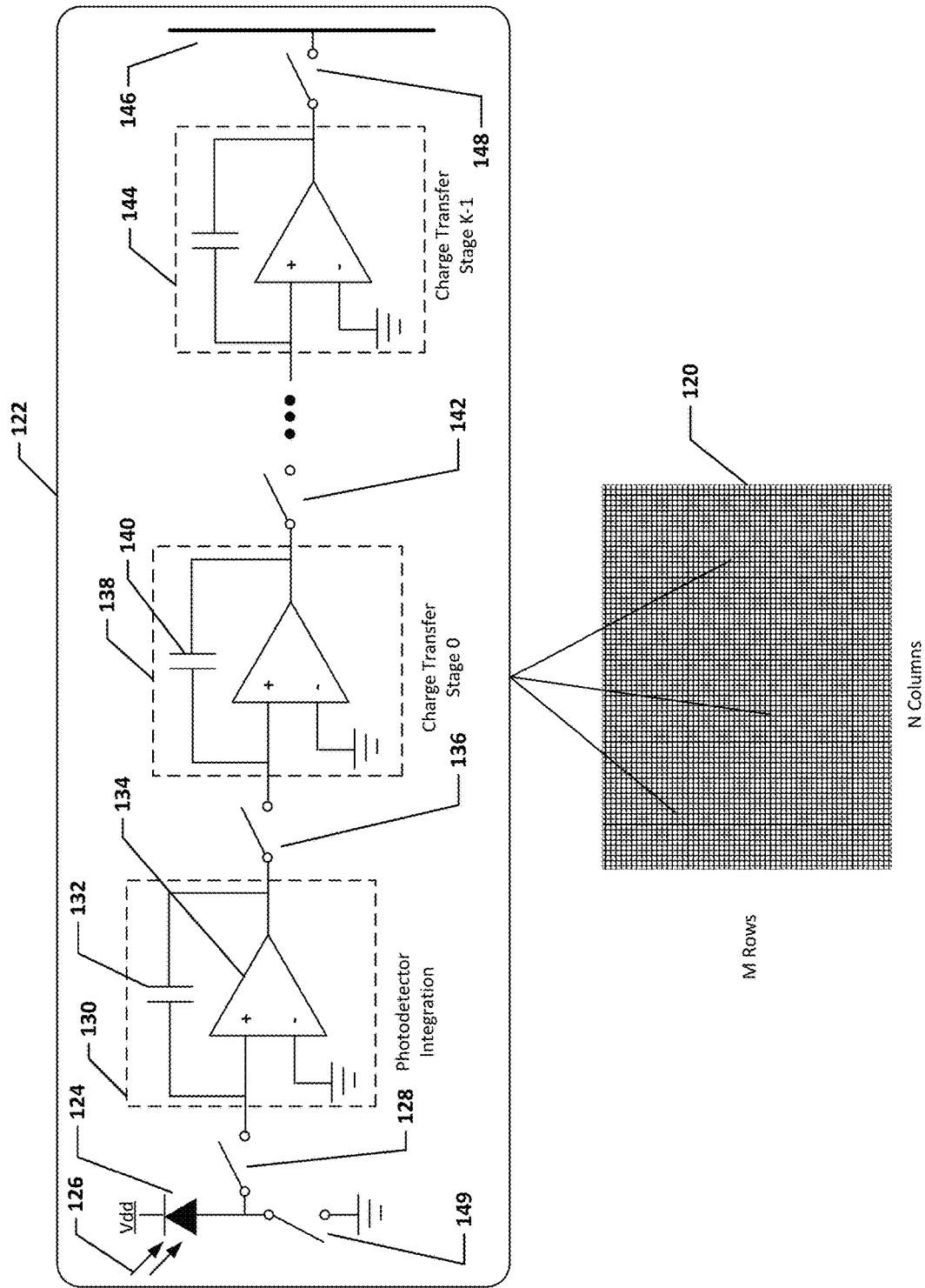
FIG. 5 illustrates an electrical functional block diagram for a detector array where each photodetector pixel consists of a single photodetector, an associated integration stage, and K charge transfer stages.

FIG. 5 shows a functional electrical diagram for detector array 120 elements. A detector array 120 consists of M rows and N columns of elements. The functionality of a single detector element 122 is shown at the top of FIG. 5. A photodetector 124 is shown in a reverse-bias configuration. Incident photons 126 at the photodetector 124 cause a current to flow when the integration gate 128 is in the gated ON position. This gating switch allows current to flow to the integration stage 130 only during times when the gate 128 is closed. Current flowing to the integrator stage 130 allows charge to collect at the capacitor 132 via the amplifier 134. It should be noted that the capacitor 123 is a functional element that represents any device or feature that collects charge due to a current flow from a photodetector 124. Those persons skilled in the art can produce replacements for the gate switch 128, integrator 134, and capacitor 132 with equal functional components while conforming to the elements of embodiments.

During a detector 122 integration cycle the intensity of the charge collected at the capacitor 132 is proportional to the number of incident photons 126 present during the gating time of the integrator 130. During photodetector 130 integration the charge transfer switch 136 remains in the open position. Upon completion of an integration cycle the integration switch 128 is opened and collected charge remains at the integrator 130 stage. During the start of the charge transfer cycle charge is migrated from the integration capacitor 132 to the charge transfer stage 0 138 capacitor 140 by closing the charge transfer stage 0 138 gate switch 136. At the exit line from the charge transfer stage 0 138 another gate switch 142 enables the transfer of charge from stage 0 138 to stage 1 144. The input switch 136 and the output switch 142 for stage 0 are not in the "on" or closed position at the same time, thus allowing charge to be transferred to and stored at stage 0 138 prior to being transferred to stage 1 on a subsequent charge transfer cycle. Charge transfer stage K−1 144 represents the last charge transfer stage for K emitter/detector cycles. Charge is transferred from stage K−1 144 to a data bus 146 leading to a 4D frame buffer when the K−1 output switch 148 is closed. At the end of each of K detector integration cycles the grounding switch 149 can be closed to remove any excess charge that may have collected at the photodetector 124.

Figure 6:
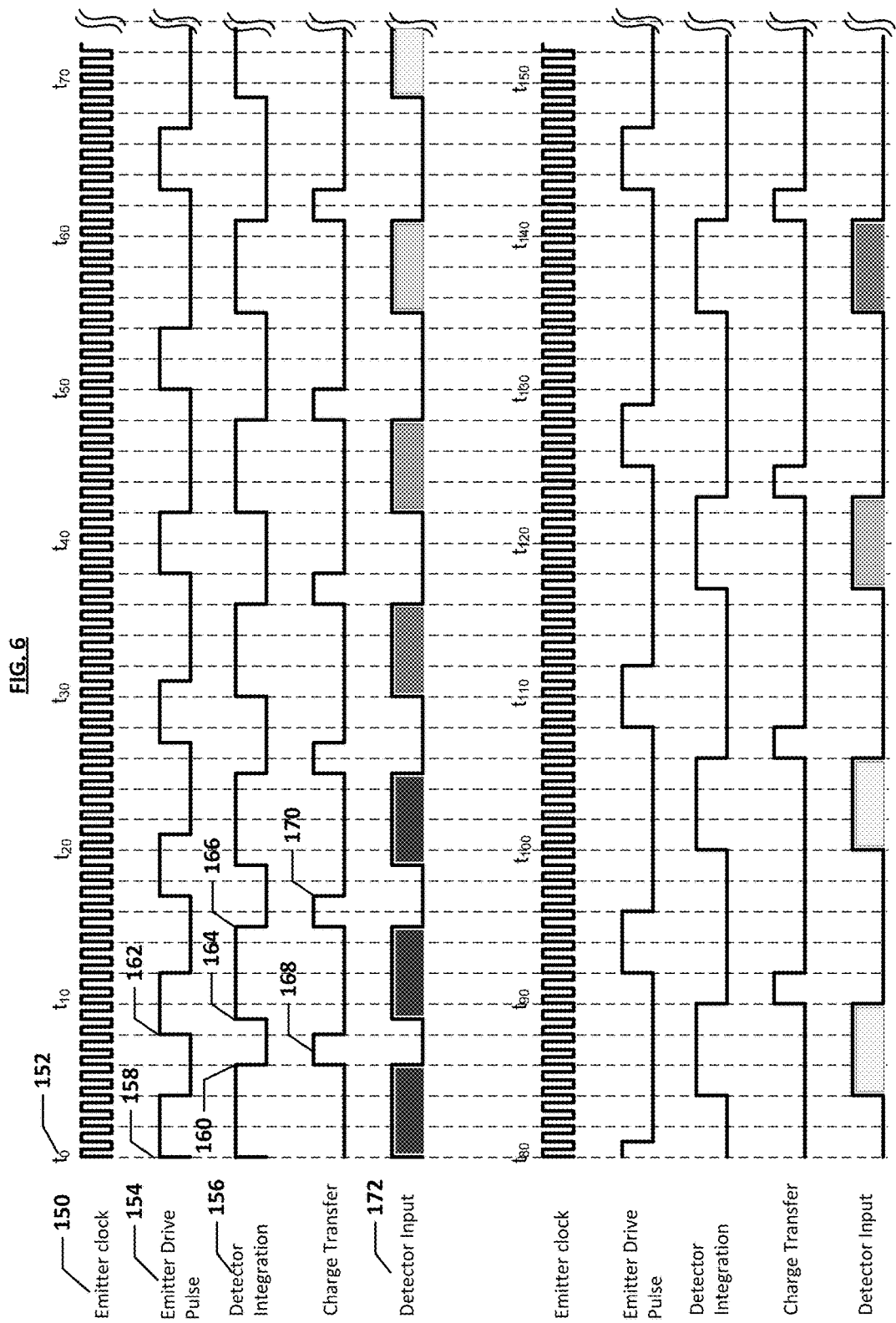
FIG. 6 illustrates an electrical timing diagram for eleven stages of emitter/detector events that constitute data collected for a single 4D frame buffer.

FIG. 6 shows electrical timing for the first eleven stages for a 4D camera emitter/detector sequence with K stages where K equals sixteen. Emitter and detector control circuitry is referenced from the emitter clock 150 that starts at $t_0$ 152. An emitter drive pulse 154 activates an emitter for four periods of the emitter clock 150 for each emitter cycle. A detector integration 156 signal determines the integration time for all integration stages in a detector array. Each detector integration period 156 equals six emitter clock 150 periods in this embodiment. The relative timing of the start of the emitter drive pulse 154 and the detector integration 156 will determine the distance range at which each emitter detector cycle will detect objects in a scene. For stage 0 of K stages the offset between the emitter start time at $t_0$ and the start of the detector integration at $t_0$ results in a minimum time of flight (TOF) of zero emitter clock 150 periods and a maximum TOF of six emitter clock 150 periods, where six periods is determined by the start time of the first emitter pulse 158 and the completion time of the first detector integration cycle 160. For the second emitter/detector stage of the sequence the start 164 of the detector integration 156 is one emitter clock 150 period after the start 162 of the second emitter drive pulse 154 and the end 166 of the second detector integration 156 is seven emitter clock 150 periods after the start 162 of the emitter drive pulse 154. The relative timing for the emitter and detector signals for the second emitter/detector stage correspond to a TOF range of one to seven emitter clock 150 periods. By increasing the relative start times for subsequent detector integration 156 periods for each of K stages the individual TOF ranges accumulate to define the range for the entire 4D camera capture sequence.

At the completion of the first 160 detector integration 156 period the integrated charge is transferred 168 from each of the M×N integration elements to each of the M×N charge transfer stage 0 elements. After the second detector integration 156 period is complete a second charge transfer 170 operation is performed that transfers charge from stage 0 to stage 1 and transfers charge from the integration stage to charge transfer stage 0. The detector input 172 signal shows times at which charge is being collected at integration stages for the M×N integration elements.

FIG. 7 shows a data element chart 180 that corresponds to the K-stage timing sequence from FIG. 6 where K=16, the emitter clock frequency is 80 MHz, and the emitter clock period is 12.5 nSec. The first column 182 shows the stage number of the sixteen stages. Each emitter cycle is four periods with the start times 184 and the end times 186 denoted by their representative $t_x$ times. Each detector integration cycle is six periods with the start times 188 and the end times 190 denoted by their representative $t_x$ times. The TOF min 192 and TOF max 194 times, denoted by the number of $t_x$ periods that define the minimum 192 and maximum 194 times are shown to establish the TOF ranges for each of the K stages. The emitter clock period of 12.5 nSec is used to convert the TOF min. ($t_x$) 192 period to a TOF min. (nSec) 196 time and to convert the TOF max. ($t_x$) 194 period to a TOF max. (nSec) 198 time. Using the formula for TOF and the speed of light, the distances corresponding to each TOF can be determined by:

$$\text{Distance} = (\text{TOF} * c)/2 \qquad \text{Eq. 1}$$

Where TOF=time of flight
c=speed of light in the medium

Using c=0.3 m/nSec as the speed of light the Minimum Dist. (m) 200 and Maximum Dist. (m) 202 values are established for the lower and upper bounds for the range detected for each of the K stages in a 4D camera capture sequence. The intensity (Hex) 204 column shows the digital hexadecimal value for the integrated intensity value for each of the K stages. It is noted that each of the M×N elements in the detector array will have K intensity values corresponding to the integrated intensities of the K stages. The timing parameters and the TOF values from FIG. 7 are the same for all M×N elements while the intensity values are only valid for element m, n in the M×N detector array.

A review of the intensity values 204 shows a minimum value 206 of 0x28 and a maximum value 208 of 0xF0. These values are designated $I_{min}[m,n]$=0x28 and $I_{max}[m,n]$=0xF0. For embodiments that utilize constant pulse width timing for all detector/emitter stages in a capture sequence, the intensity value inserted in the color plane buffer is determined by:

$$I_{color}[m,n] = I_{max}[m,n] - I_{min}[m,n] \qquad \text{Eq. 2}$$

By utilizing Eq. 2 for color plane intensity the effects of ambient light are eliminated by subtracting out the photonic component of intensity $I_{min}[m,n]$ that is due to ambient light on the scene or object. Eq. 2 is an effective approach for eliminating ambient light when the photodetector integration response has a linear relationship to the number of incident photons at the photodetector. For non-linear photonic/charge collection relationships Eq. 2 would be modified to account for the second-order or N-order relationship between incident photons and integrated charge intensity.

For each photodetector m,n in embodiments that utilize multi-color filter elements the $I_{color}[m,n]$ value is stored at location m,n in the color plane that corresponds to the color of the filter. As an example, an embodiment with a Bayer filter pattern (RGBG) will have M×N/2 green filter detectors, M×N/4 blue filter detectors, and M×N/4 red filter detectors. At the completion of K integration stages, subsequent filling of the 4D frame buffer, and determination of the M×N color values the controller will store the M×N/4 $I_{red}[m,n]$ values at the appropriate locations in the red color plane memory. In turn the controller will determine and store the M×N/4 blue values in the appropriate locations in the blue color plane memory and the M×N/2 green values in the appropriate locations in the green color plane memory.

Referring again to FIG. 7 the maximum value 208 occurs in three consecutive integration cycles, indicating that an entire reflected signal pulse was captured with three consecutive integration windows. By utilizing the minimum distance of the last of the maximum intensity stages the controller determines that the distance to the object for this pixel m,n is 30 meters. The value corresponding to 30 meters is stored at location m,n in the depth map memory. In practice the maximum intensity value may only occur during a single integration cycle. For these cases the controller can utilize partial integration signals to determine object distances. In embodiments the emitter pulse width and the detector pulse width are selected such that there will be at least one full intensity integration cycle that includes a full-width reflected signal. Furthermore, the relative offset of the start times for successive emitter/detector cycles will ensure that at least one integration cycle will include a leading-edge-clipped reflected signal and at least one integration cycle will include a trailing-edge-clipped reflected signal. The TOF for the leading-edge-clipped and trailing-edge-clipped integration cycles are determined by:

$$TOF_{leading\text{-}edge\text{-}clipped}(i, m, n) = \qquad\qquad\qquad\text{(Eq. 3)}$$
$$TOF_{min}(i) - \frac{I_{max}(m, n) - I(i, m, n)}{I_{max}(m, n) - I_{min}(m, n)}$$

$$TOF_{trailing\text{-}edge\text{-}clipped}(j, m, n) = \qquad\qquad\qquad\text{(Eq. 4)}$$
$$TOF_{max}(j) - \frac{I(j, m, n) - I_{min}(m, n)}{I_{max}(m, n) - I_{min}(m, n)}$$

where i is the stage at which the leading-edge-clipped signal is detected
   j is the stage at which the trailing-edge-clipped signal is detected
   I(i,m,n) is the intensity value for pixel m,n at stage i
   I(j,m,n) is the intensity value for pixel m,n at stage j
   $I_{min}$(m,n) is the minimum intensity value for the current emitter/detector sequence
   $I_{max}$(m,n) is the maximum intensity value for the current emitter/detector sequence
   $TOF_{min}$(i) is the minimum TOF for stage i of the detector sequence
   $TOF_{max}$(j) is the maximum TOF for stage j of the detector sequence The embodiments from FIGS. 6 and 7 implement a K-cycle sequence of emitter and detector pulses with an elapsed time of 3.075 microseconds (246 emitter clock periods times 12.5 nSec/emitter clock period). The elapsed time for K emitter/detector cycles that comprise a 4D image cycle is an important parameter for in motion applications. The objective of embodiments for in-motion imaging is to limit the relative movement between the scene and the detectors to 0.05 pixels from the start of the first emitter cycle to the end of the last detector cycle. The relative movement between scene objects and detector pixels is a function of parameters including, but not limited to:
   camera velocity and direction
   camera transport velocity and direction
   object velocity and direction
   field of view of camera
   resolution of detector array
   minimum range of 4D measurements
   maximum range of 4D measurements For ground-based vehicle-mounted and low-altitude aircraft-mounted applications the 4D imaging cycle time should be no longer than 50 microseconds. For higher-altitude aircraft at higher speeds the 4D imaging cycle time should be no longer than 10 microseconds. One skilled in the art can envision embodiments where the relative movement between scene objects and the camera exceeds 0.05 pixels. These longer-image-cycle-time embodiments will utilize inter-sample trajectory techniques to account for information from subsequent emitter/detector stages that do not align within the structure of the detector array grid.

Embodiments described in FIGS. 6 and 7 represent signal timing and integrated intensity values for uniform pulse widths in a relatively obstruction-free environment. Sensors will often operate in environments that present less-than-ideal sensing conditions. For optical sensors, conditions that cause incident or reflected signal attenuation require additional consideration when determining color and intensity values and when determining object distances. Atmospheric conditions like dust, rain, fog, sleet and snow will cause signal attenuation due to photon obstruction.

Figure 8:
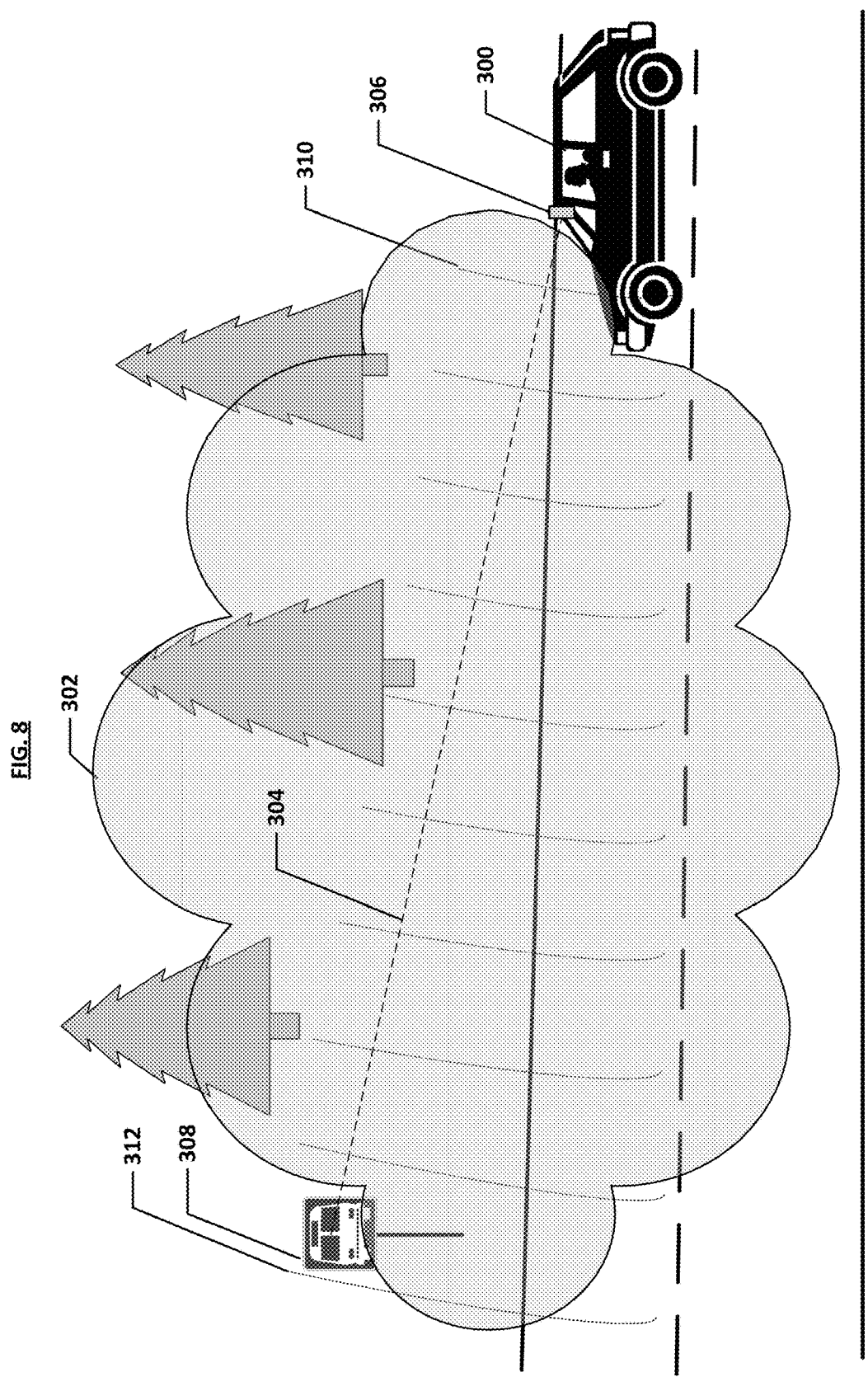
FIG. 8 illustrates imaging of an object with fog obscuring an optical path.

An embodiment in FIG. 8 utilizes the signal timing from FIGS. 6 and 7. The embodiment, in contrast to FIGS. 6 and 7, utilizes RGB information for each pixel. The RGB information may be produced by a Bayer pattern or some other RGB micro-filter configuration at the detector array or it is produced by a monochrome or other grayscale detector array with alternating red, green and blue illumination. FIG. 8 shows a vehicle 300 traversing a roadway in atmospheric conditions that include fog 302. The optical path 304 from the camera 306 to the object 308 is shown projecting through the fog 302. The dotted arcs show the approximate location of the maximum distance for each of the first ten stages of the K stages where K=16 in the emitter/detector camera 306 sequence. The stage 0 maximum distance 310 is the closest distance range to the camera 306 and the stage 9 maximum distance 312 is the range that includes the object 308.

FIG. 9 shows the data element chart 314 that corresponds to the K-stage timing sequence where K=16, the emitter clock frequency is 80 MHz, and the emitter clock period is 12.5 nSec. The integrated intensity values for each stage are shown for blue 316, green 318 and red 320 intensities. Since the camera is in a signal-attenuating environment the minimum intensity value for each color is determined utilizing intensity values from distance ranges beyond the detected object. Utilizing the intensity values from stage 15 the values of $I_{min,red}$(m,n)=0x26 322, $I_{min,green}$(m,n)=0x27 324, $I_{min,blue}$(m,n)=0x28 326 are assigned for the present sequence.

Based on the selection of emitter and detector pulse widths for this embodiment, the control algorithm establishes that the intensity values transition from environmental values at stage 6 to ambient values at stage 12. Furthermore, the control algorithm determines that anywhere from one to three stages will contain an integrated signal that includes 100% of the object-reflected waveform. From the data in FIG. 9 the algorithm establishes stage 9 as the stage that contains the full duration of the reflected object waveform. The RGB intensity values for stage 11 328 are higher in amplitude than the values captured during stages 12 through 15. The higher amplitude signifies that the stage 11 328 values are a combination of ambient signals and reflected signals from the object. Furthermore, due to the selected timing of the emitter and detector pulse widths, the reflected intensity value is a partial signal value resulting from a trailing-edge-clipped return signal. The stage 7 332 values are a combination of environment signals and reflected signals from the object, where environment signals are defined as return signals from the environment between the detected object and the sensor. Due to the selected timing of the emitter and detector pulse widths, the reflected intensity value is a partial signal value resulting from a leading-edge-clipped return signal. Utilizing the select signal timing and the sensed intensity values, the values obtained for the select stages are utilized to establish the distance to the object and to determine the color values for the object.

| Stage # | Environment Signal % | Object Signal % | Ambient Signal % |
|---|---|---|---|
| 6 | 100 | 0 | 0 |
| 7 | $E_0$ | $1 - E_0$ | 0 |
| 8 | not used for this computation | | |
| 9 | $E_1$ | $1 - E_1 - A_1$ | $A_1$ |
| 10 | not used for this computation | | |
| 11 | 0 | $1 - A_0$ | $A_0$ |
| 12 | 0 | 0 | 100 |

$$I(clr,m,n,s-3) = I_{env}(clr,m,n) \quad \text{Eq. 5}$$

$$I(clr,m,n,s-2) = E_0 * I_{env}(clr,m,n) + (1-E_0) I_{obj}(clr,m,n) \quad \text{Eq. 6}$$

$$I(clr,m,n,s) = E_1 * I_{env}(clr,m,n) + (1-E_1-A_1) I_{obj}(clr,m,n) + A_1 * I_{amb}(clr,m,n) \quad \text{Eq. 7}$$

$$I(clr,m,n,s+2) = A_0 * I_{amb}(clr,m,n) + (1-A_0) I_{obj}(clr,m,n) \quad \text{Eq. 8}$$

$$I(clr,m,n,s+3) = I_{amb}(clr,m,n) \quad \text{Eq. 9}$$

$$E_0 = E_1 + (2 * t_{emitter-clock-cycle})/D \quad \text{Eq. 10}$$

$$A_1 = A_0 + (2 * t_{emitter-clock-cycle})/D \quad \text{Eq. 11}$$

Where s is the stage number identifier for the detector stage with a 100% reflected signal
clr is the color of the pixel
m,n is the identifier of the pixel in the array
$I_{env}(\ )$ is the detected intensity for the stage with a 100% environmental signal
$I_{amb}(\ )$ is the detected intensity for the stage with a 100% ambient signal
$I_{obj}(\ )$ is the computed intensity for the object
$E_0$ is the percentage of the stage s−2 intensity that is due to the environmental signal
$E_1$ is the percentage of the stage s intensity that is due to the environmental signal
$A_0$ is the percentage of the stage s intensity that is due to the ambient signal
$A_1$ is the percentage of the stage s+2 intensity that is due to the ambient signal
$t_{emitter-clock-cycle}$ is the period of the emitter clock
D is the duty cycle of the emitter/detector for the stage of the sequence and is defined as the emitter-pulse-width divided by the detector-pulse-width for the stage Utilizing the five equations (Eqs. 6, 7, 8, 10 and 11) with five unknowns, ($I_{obj}(\ )$, $E_0$, $E_1$, $A_0$ and $A_1$) the control algorithms determine $I_{obj}(\ )$ for each color and each pixel and assigns the computed intensity values to the appropriate locations in the color frame buffers. The distance to the object is determined by computing TOF to the object based on Eq. 7:

$$TOF(clr,m,n) = s) + E * t_{detector-pulse-width}(s) \quad \text{Eq. 12}$$

Where TOF( ) is the time of flight for a particular pixel
$TOF_{min}(s)$ is the minimum time of flight for stage s
$E_1$ is the percentage of the stage s intensity that is due to the environmental signal
$t_{detector-pulse-width}(s)$ is the width of the detector pulse for stage s The identification of stage s for Eqs. 5-12 depends on knowledge of the emitter pulse width for each stage and the detector pulse width for each stage. The known pulse widths determine the duty cycle and determine how many stages are involved in the transition from environmental signals to ambient signals for each pixel. Eqs. 5-12 are applicable for embodiments where the emitter pulses are shorter in duration than the detector pulses. For embodiments where emitter pulses are longer than detector pulses Eq. 7 will compute to either $E_1$ or $A_1$ being equal to zero. As a result, two more equations with two more unknowns are necessary to resolve the intensity values of the object. The first additional equation will describe two new unknowns ($A_2$ and $E_2$) as a function of the measured stage intensity and the second additional equation will describe $A_2$ and $E_2$ as a function of the stage duty cycle.

In various embodiments, it will be appreciated that utilizing techniques for evaluating signal attenuation may utilize a minimum of five emitter/detector cycles—one cycle in which an environmental detected signal is determined, one cycle containing a leading edge detected signal of the active pulsed signal, one full-emitter-cycle of the detected signal of the active pulsed signal, one cycle containing a trailing-edge detected signal, and one cycle containing an ambient detected signal. Depending upon timing, field of vision, distances, ambient and environmental conditions, additional emitter/detector cycles may be needed to obtain the necessary information to utilize the techniques for evaluating signal attenuation as described with respect to these embodiments.

For uniform emitter pulses Eq. 3 and Eq. 4 will produce the same value for TOF for each pixel m,n. Due to signal noise and ambient light TOF values based on higher integrated intensity values will produce higher accuracy distance computations than lower integrated intensity values. In embodiments the controller will utilize only one of values from Eq. 3 or Eq. 4 to establish the TOF for the pixel, with the preferred TOF value being selected from the equation that utilizes the largest amplitude integrated intensity value.

Figure 10:
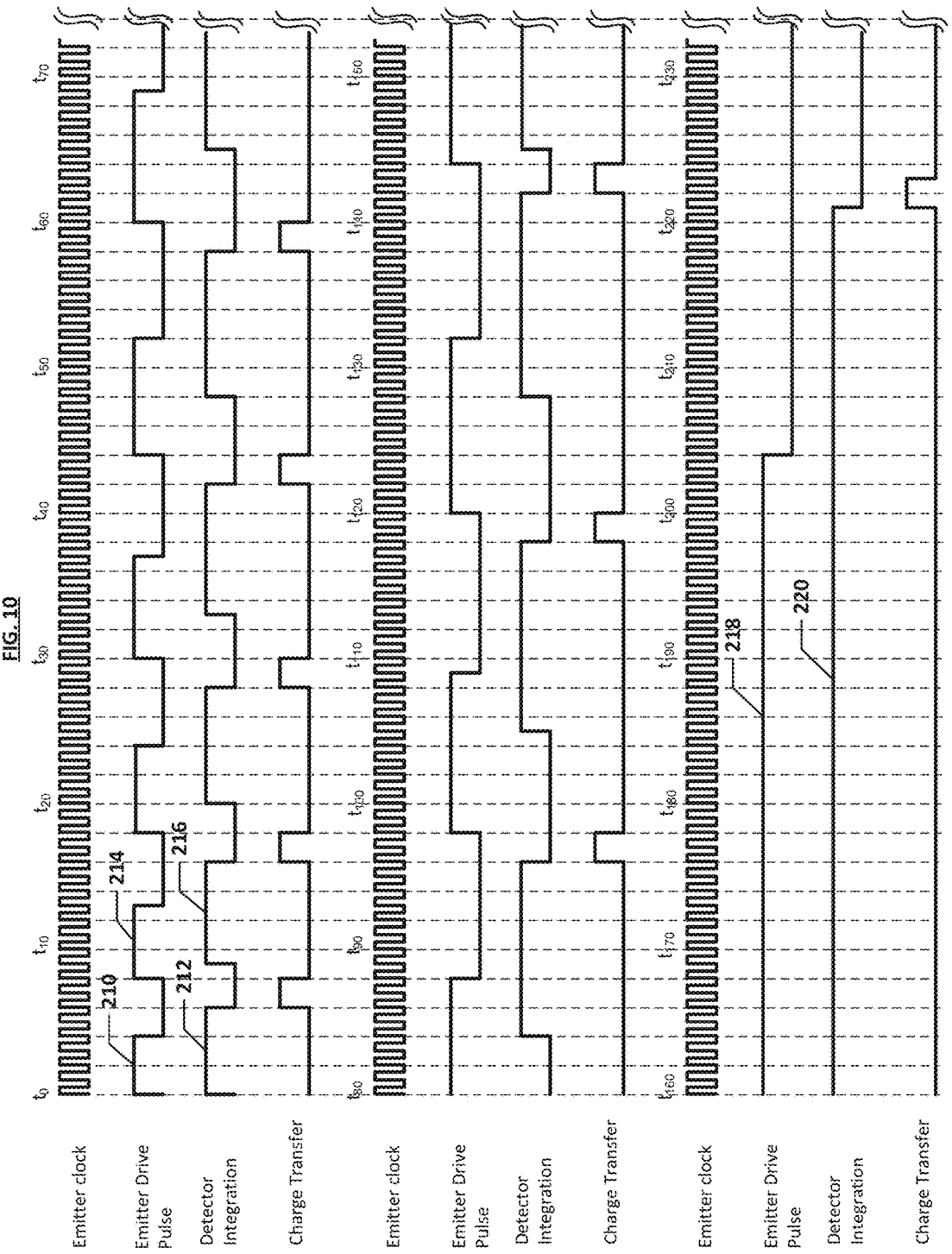
FIG. 10 illustrates an electrical timing diagram for ten stages of detector events for a single 4D frame buffer wherein the final stage is expanded in time to integrate more color information.

Objects farther from 4D cameras will receive less light from emitters than objects closer to the camera. As a result, reflected signals from far objects will have lower intensity than reflected signals from closer objects. One method to compensate for lower intensity return signals is to increase the emitter pulse width and to increase the detector integration time, thus increasing the intensity of the integrated signal for a given object distance. FIG. 10 shows electrical timing for an embodiment that utilizes ten stages in an emitter/detector sequence. In contrast to a prior embodiment wherein all emitter pulses were a constant length and all detector integration cycles were a constant length, this embodiment utilizes steadily increasing emitter pulse periods and detector integration periods.

Stage 0 has a four-period emitter cycle 210 and a six-period detector integration cycle 212. Stage 1 has a five-period emitter cycle 214 and has a seven-period detector integration cycle 216. Stage 9 is a special cycle that has a very long emitter pulse 218 and a correspondingly long detector integration cycle 220. This special long emitter/detector cycle may not be used for distance determination but is used to establish accurate color values for objects that are not very retroreflective at the wavelengths of the camera emitter.

FIG. 11 shows a data table 230 with TOF ranges that correspond to the timing sequences from FIG. 10. Stages 0 through 8 are used to determine values for the depth map for each of the M×N pixels. Stage 9 is utilized for determining the $I_{color}[m,n]$ value for the separate color planes.

In previous embodiments the distances to objects computed via TOF were dependent on distance ranges established by the multi-period detector integration cycles. It may be desirable to achieve greater precision for TOF distance measurements. FIG. 12a shows a possible intensity curve 240 for a 50 nSec emitter pulse. The curve 240 has a slower turn-on 242 time ($t_{ON}$) than a turn-off 244 time ($t_{OFF}$) and has a maximum value 246. The maximum intensity of an integrated detector value is proportional to the area under the curve 240. FIG. 12b 248 shows the cumulative integrated intensity vs. time for the same emitter pulse. For purposes of Eq. 13 and Eq. 14 below the information from FIG. 12b will be expressed as f(t) where the cumulative intensity value, expressed as a percentage of the maximum intensity value, is a function of time. For partial intensity values in the K-stage sequence, utilizing the cumulative intensity curve, the TOF for the leading-edge-clipped and trailing-edge-clipped integration cycles are determined by:

$$TOF_{leading\text{-}edge\text{-}clipped}(i, m, n) = \quad \text{(Eq. 13)}$$
$$TOF_{min}(i) - f^{-1}\left\{\frac{I_{max}(m, n) - I(i, m, n)}{I_{max}(m, n) - I_{min}(m, n)}\right\}$$

$$TOF_{trailing\text{-}edge\text{-}clipped}(j, m, n) = \quad \text{(Eq. 14)}$$
$$TOF_{max}(j) - f^{-1}\left\{\frac{I(j, m, n) - I_{min}(m, n)}{I_{max}(m, n) - I_{min}(m, n)}\right\}$$

where i is the stage at which the leading-edge-clipped signal is detected
    j is the stage at which the trailing-edge-clipped signal is detected
    I(i,m,n) is the intensity value for pixel m,n at stage i
    I(j,m,n) is the intensity value for pixel m,n at stage j
    $I_{min}$(m,n) is the minimum intensity value for the current emitter/detector sequence
    $I_{max}$(m,n) is the maximum intensity value for the current emitter/detector sequence
    $TOF_{min}$(i) is the minimum TOF for stage i of the detector sequence
    $TOF_{max}$(j) is the maximum TOF for stage j of the detector sequence
    $f^{-1}$(t) is the inverse function of f(t) and expresses the point in time during the reflected pulse integration at which the cumulative intensity is equal to the non-integrated portion of the leading edge signal or at which time the cumulative intensity is equal to the integrated portion of the trailing edge signal In practice f(t) will likely be a non-linear or higher-order relationship between cumulative intensity and time. As such, the inverse function $f^{-1}$(t) may be implemented in embodiments as a lookup table or some other numerical conversion function.

Figure 13A:
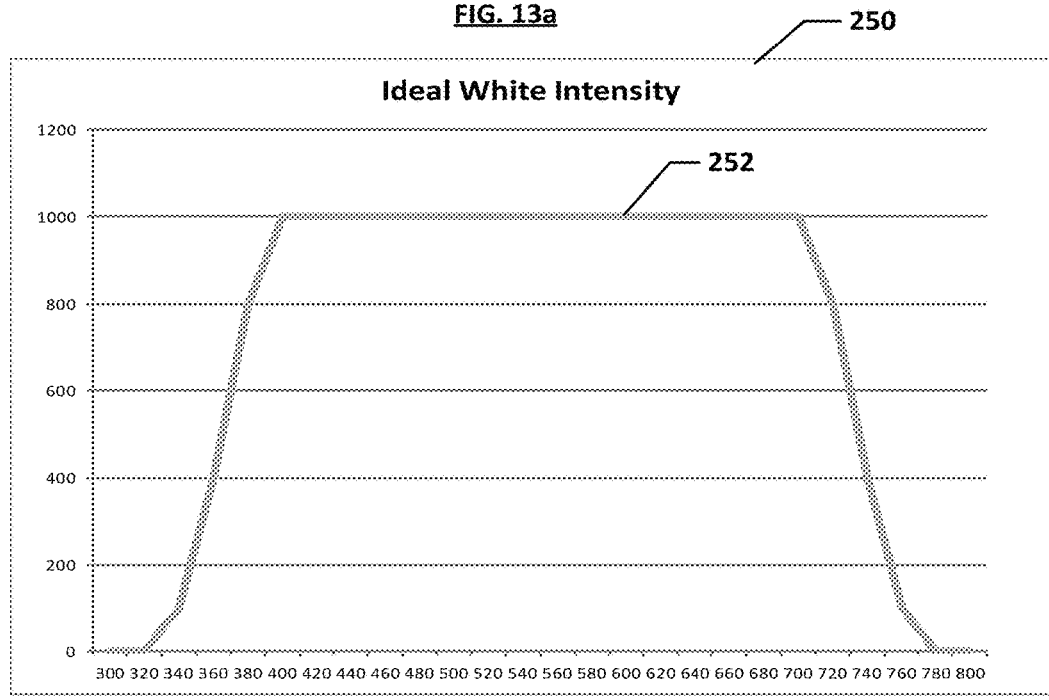
FIG. 13a illustrates a spectral output for an ideal visible spectrum emitter.
Figure 13B:
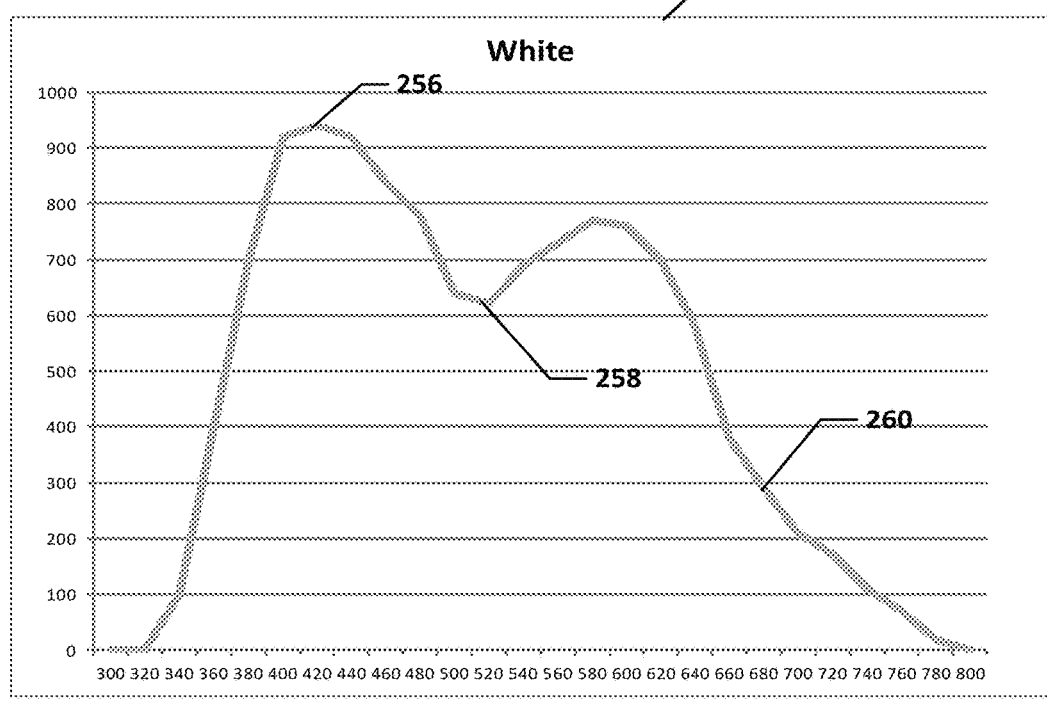
FIG. 13b illustrates a spectral output for a typical white LED emitter.
Figure 14A:
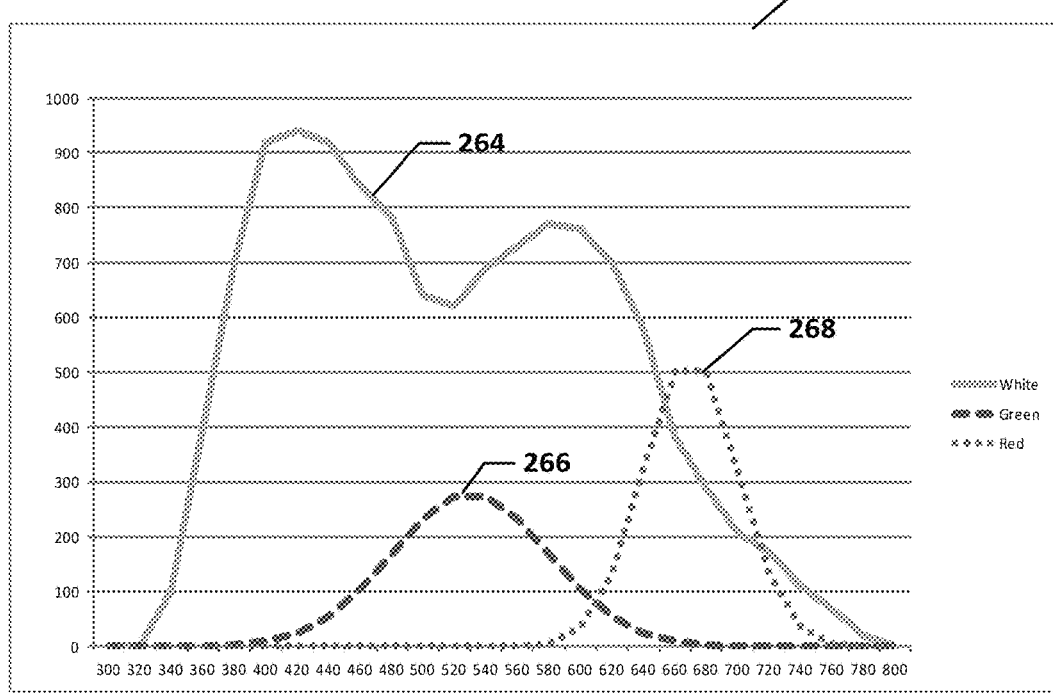
FIG. 14a illustrates a spectral output for red LED and green LED emitters along with white LED emitters.
Figure 14B:
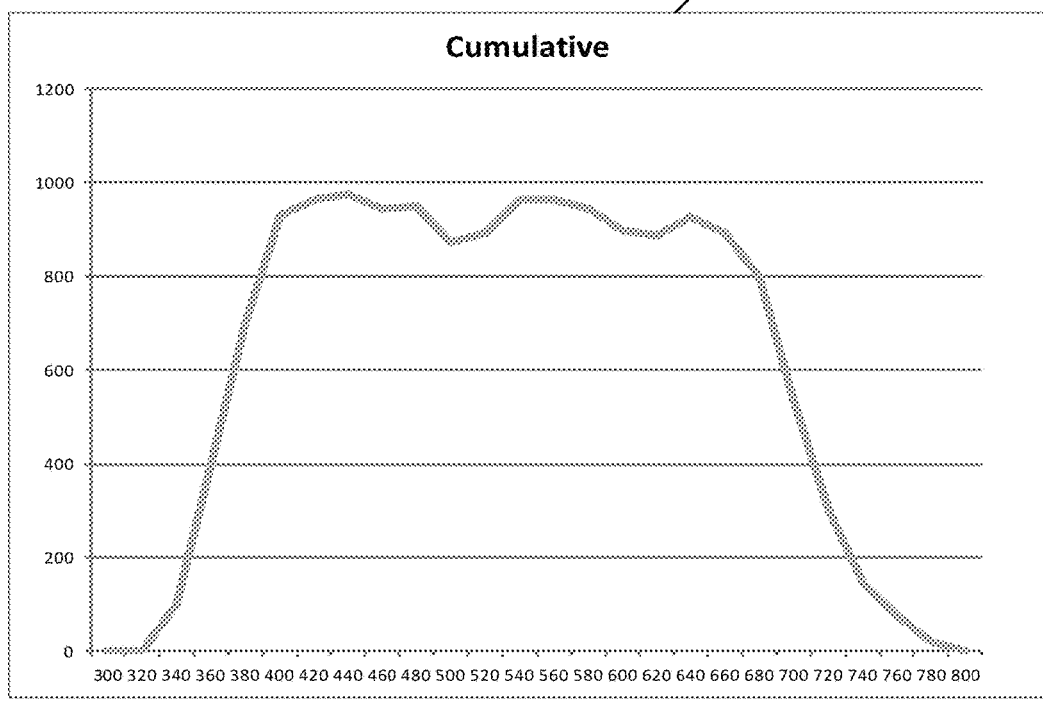
FIG. 14b illustrates a cumulative spectral output for the combined signals generated with white, green, and red LEDs.

FIG. 13a shows the spectral output 250 for an ideal white (full visible spectrum) emitter. The output energy is at full intensity 252 throughout the range of 400 nanometers to 700 nanometers. FIG. 13b shows the spectral output 254 for an LED-based white emitter. The curve shows a peak intensity 256 around 430 nanometers, somewhat lower intensity 258 around 520 nanometers, and substantially lower intensity 260 around 660 nanometers. Although not a requirement, in embodiments it is desirable to have a more-uniform spectral output for the 4D camera light source. FIG. 14a shows the spectral output 262 for three LED types. White 264, green 266, and red 268 response curves are shown with their intensity values normalized to one another. The three color component LEDs are combined to produce a cumulative emitter response that is more uniform throughout the desired spectral range of the device. The act of "combining" as described herein refers to selectively populating the emitter array with emitter components that, when switched on simultaneously, will produced the desired cumulative effect for the output spectral response. FIG. 14b shows the spectral output 270 of the combined signal from the three LED emitter responses depicted in FIG. 14a.

Figure 15:
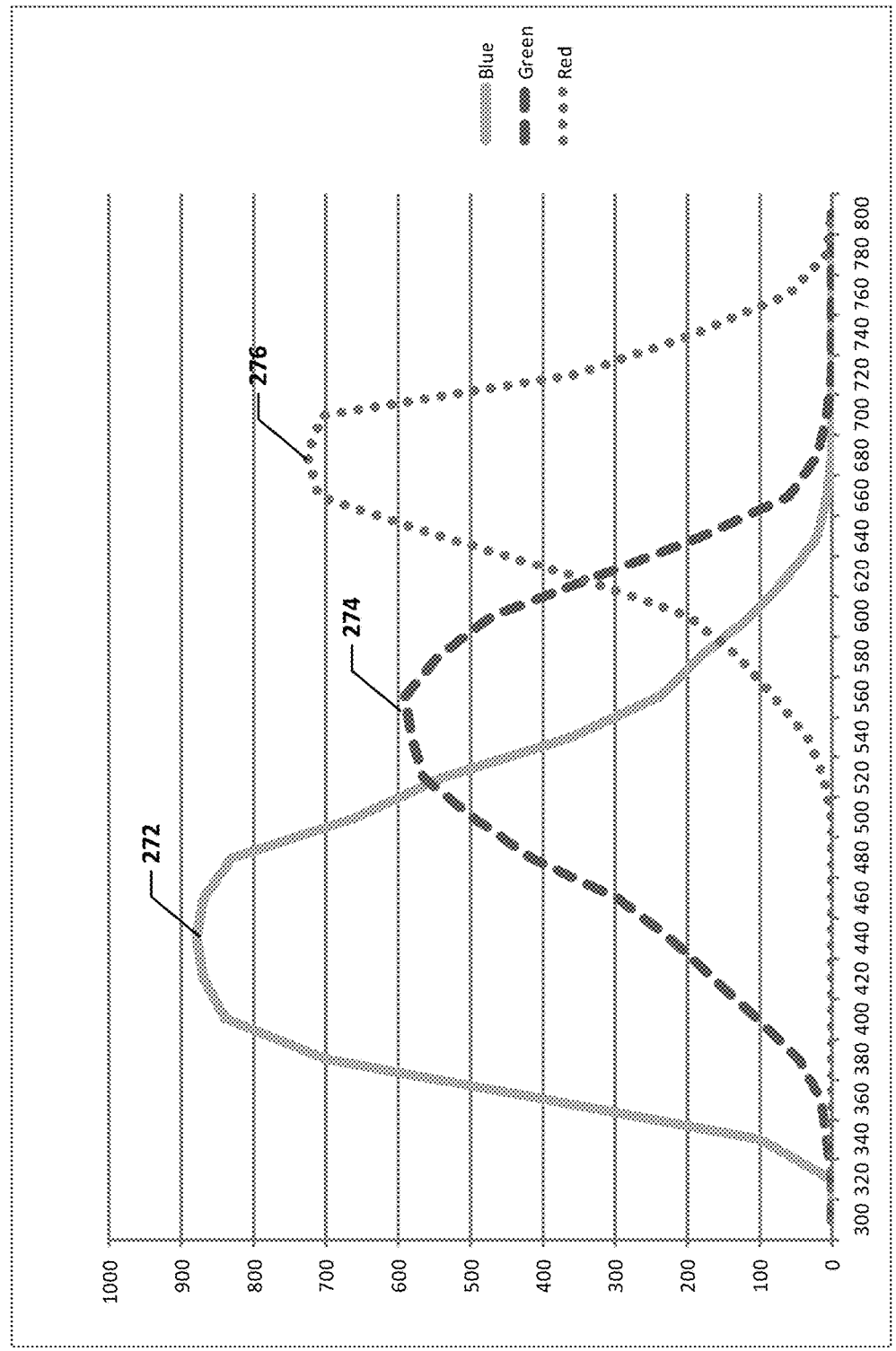
FIG. 15 shows the spectral output for blue, red, and green emitters.

In embodiments the intensity determination for separate color planes is achieved with an unfiltered detector array and selective use of multi-colored emitters. FIG. 15 shows the spectral output for LEDs utilized in an RGB configuration. Information is produced for the blue color plane when emitter/detector cycles utilize the blue 272 LEDs, information is produced for the green color plane when emitter/detector cycles utilize the green 274 LEDs, and information is produced for the red color plane when emitter/detector cycles utilize the red 276 LEDs. Embodiments that utilize an unfiltered detector array or a wide-bandpass-filtered array and emitters from separate wavelength bands can arrange emitter/detector stages as single-wavelength emitter-detector stages or multi-wavelength emitter/detector stages. An example in Table 1 below shows multiple emitter/detector stages for a K-cycle sequence with K=12, whereby each emitter wavelength is utilized in a round-robin fashion.

TABLE 1

Round-robin emitters within a single K-stage sequence

| Stage # | Emitter(s) | Emitter/Detector Offset |
|---|---|---|
| 0 | Red | 0 |
| 1 | Green | 0 |
| 2 | Blue | 0 |
| 3 | Red | 1 |
| 4 | Green | 1 |
| 5 | Blue | 1 |
| 6 | Red | 2 |
| 7 | Green | 2 |
| 8 | Blue | 2 |
| 9 | Red | 3 |
| 10 | Green | 3 |
| 11 | Blue | 3 |

An example in Table 2 below shows multiple emitter/detector stages for a K-stage sequence with K=12, whereby each emitter wavelength is utilized for K/3 sequential stages.

TABLE 2

Sequential emitter events within a single K-stage sequence

| Stage # | Emitter(s) | Emitter/Detector Offset |
|---|---|---|
| 0 | Red | 0 |
| 1 | Red | 1 |
| 2 | Red | 2 |
| 3 | Red | 3 |
| 4 | Green | 0 |
| 5 | Green | 1 |
| 6 | Green | 2 |
| 7 | Green | 3 |
| 8 | Blue | 0 |
| 9 | Blue | 1 |
| 10 | Blue | 2 |
| 11 | Blue | 3 |

A K-stage sequence with K=12 can also be allocated to a single wavelength emitter, with subsequent K-stage sequences allocated to other wavelengths in a round-robin fashion as shown in Table 3 below.

TABLE 3

Sequential emitter events in separate K-stage sequences

| Cycle # | Event # | Emitter(s) | Emitter/Detector Offset |
|---|---|---|---|
| 0 | 0 | Red | 0 |
| 0 | 1 | Red | 1 |

TABLE 3-continued

Sequential emitter events in separate K-stage sequences

| Cycle # | Event # | Emitter(s) | Emitter/Detector Offset |
|---|---|---|---|
| 0 | 2 | Red | 2 |
| 0 | 3 | Red | 3 |
| 0 | 4 | Red | 4 |
| 0 | 5 | Red | 5 |
| 0 | 6 | Red | 6 |
| 0 | 7 | Red | 7 |
| 0 | 8 | Red | 8 |
| 0 | 9 | Red | 9 |
| 0 | 10 | Red | 10 |
| 0 | 11 | Red | 11 |
| 1 | 0 | Green | 0 |
| 1 | 1 | Green | 1 |
| 1 | 2 | Green | 2 |
| 1 | 3 | Green | 3 |
| 1 | 4 | Green | 4 |
| 1 | 5 | Green | 5 |
| 1 | 6 | Green | 6 |
| 1 | 7 | Green | 7 |
| 1 | 8 | Green | 8 |
| 1 | 9 | Green | 9 |
| 1 | 10 | Green | 10 |
| 1 | 11 | Green | 11 |
| 2 | 0 | Blue | 0 |
| 2 | 1 | Blue | 1 |
| 2 | 2 | Blue | 2 |
| 2 | 3 | Blue | 3 |
| 2 | 4 | Blue | 4 |
| 2 | 5 | Blue | 5 |
| 2 | 6 | Blue | 6 |
| 2 | 7 | Blue | 7 |
| 2 | 8 | Blue | 8 |
| 2 | 9 | Blue | 9 |
| 2 | 10 | Blue | 10 |
| 2 | 11 | Blue | 11 |

Embodiments that utilize individual detector filters will have certain advantages and disadvantages over embodiments that utilize separate wavelength emitters to achieve multi-color detected signals. Table 4 below compares the relative advantages of embodiments.

TABLE 4

Comparison of detector filter techniques for visible spectrum embodiments

| Det. Filter(s) | Emitter(s) | # of Rs | # of Gs | # of Bs | Advantage |
|---|---|---|---|---|---|
| RGBG | 400-700 nm | M × N/4 | M × N/2 | M × N/4 | Inc. range/precision |
| None | RGB | M × N | M × N | M × N | Inc. spatial resolution |

Figure 16:
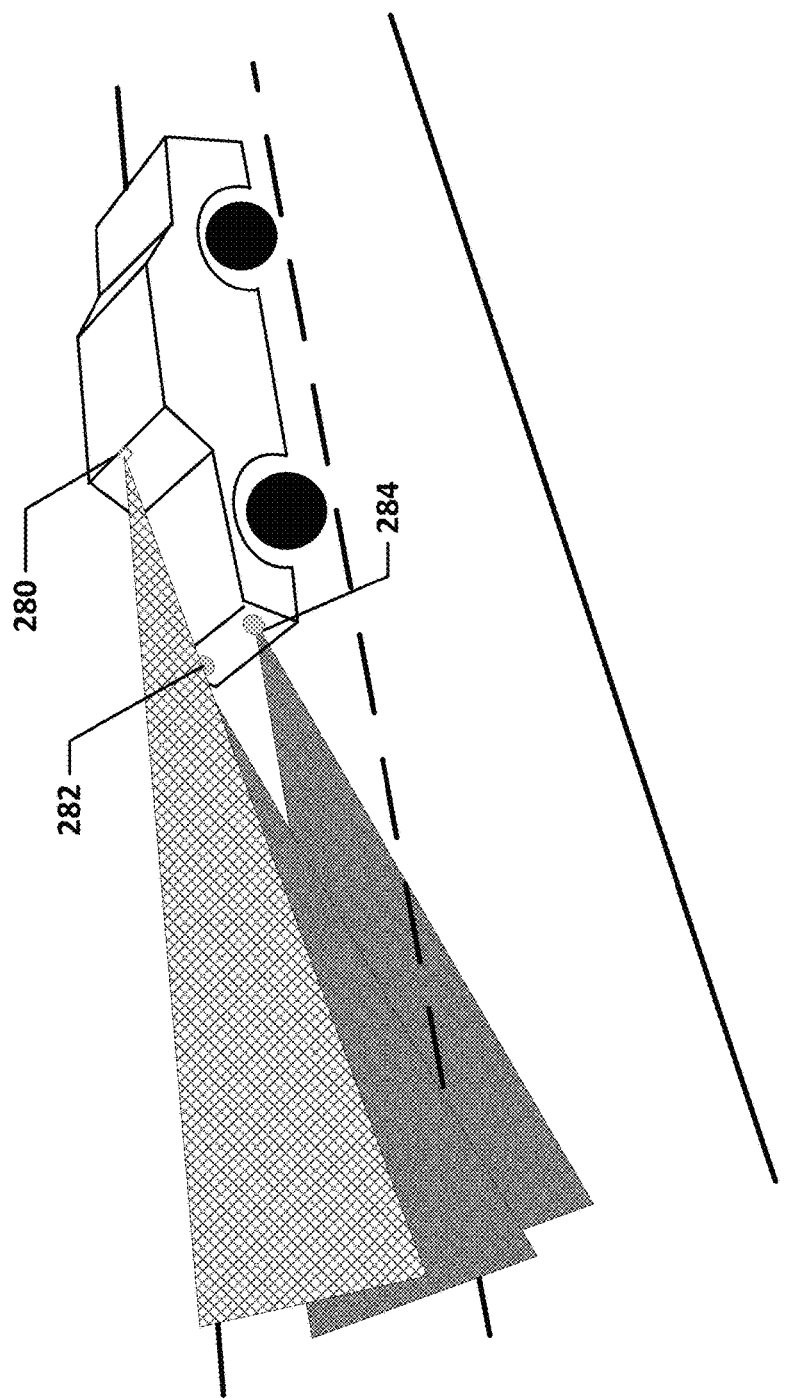
FIG. 16 illustrates an automotive configuration where emitted light is generated by vehicle headlamps and detector optical and electrical components are housed inside a vehicle separated from emitters.

FIG. 16 depicts an embodiment wherein the vehicle headlamps 282, 284 perform the illumination function for the camera 280. Emitter (headlamp) 282, 284 and detector control can reside in the headlamp control circuitry, in the camera 280, in the electronic control module (ECM), or in another on-board location that can ensure controllable timing between emitter events and detector events.

Figure 17:
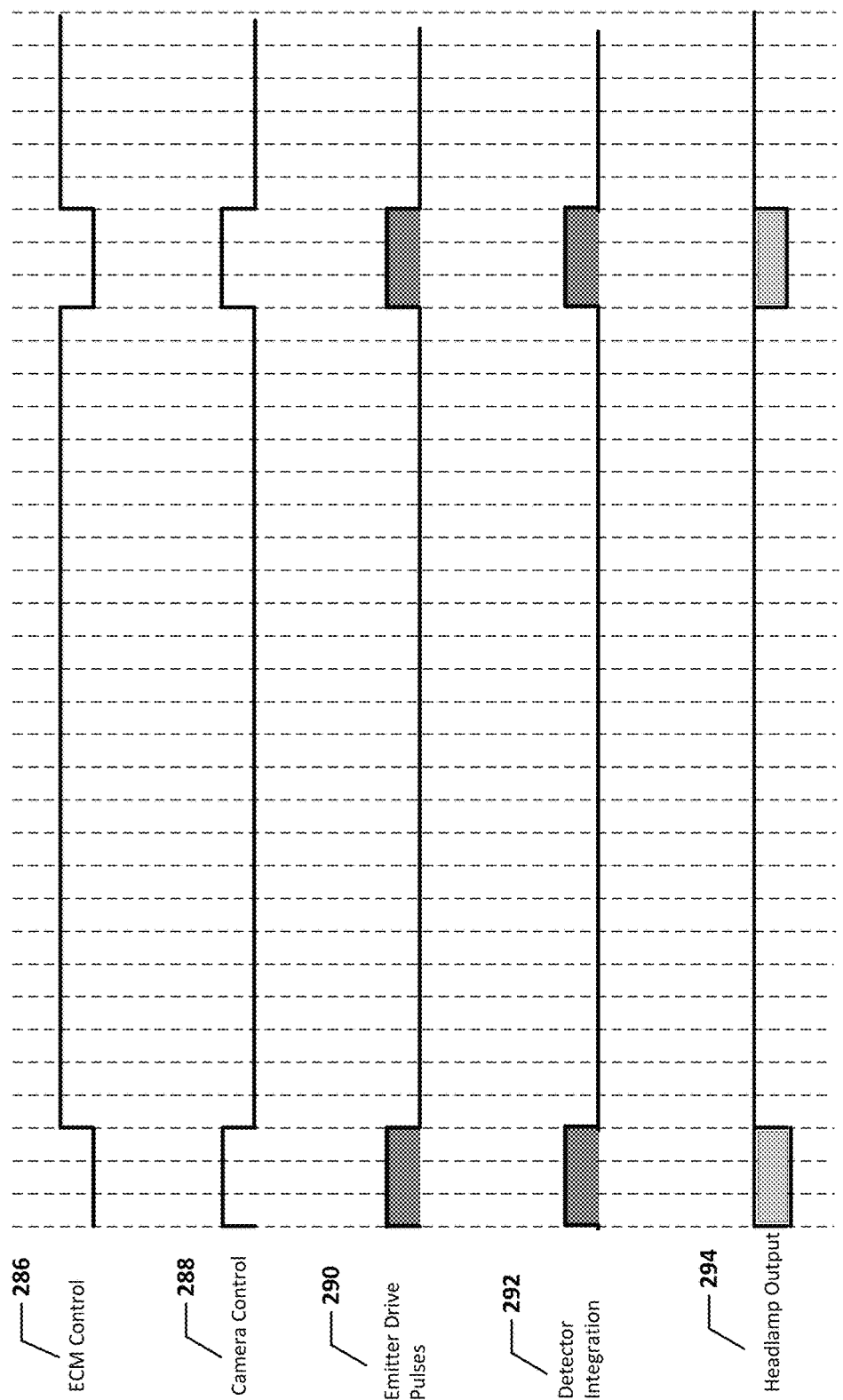
FIG. 17 illustrates a headlamp control timing in an automotive configuration whereby 4D camera circuitry assumes control of the headlamps.

FIG. 17 shows electrical timing elements for a distributed camera system that utilizes vehicle headlamps for emitter illumination. The headlamps are controlled by the ECM during non-imaging periods and by the camera during imaging periods. The ECM Control 286 signal specifies times at which the ECM will control the on and off states of the headlamps and the Camera Control 288 signal specifies when the camera will control the emitters (headlamps). Emitter Drive Pulses 290 and Detector Integration 292 are shown occurring only during the times that Camera Control 288 is in charge of the headlamps. The headlamp output 294 shows the headlamps in multiple on/off states during camera control 288 and in the on state during ECM control 286.

Figure 18:
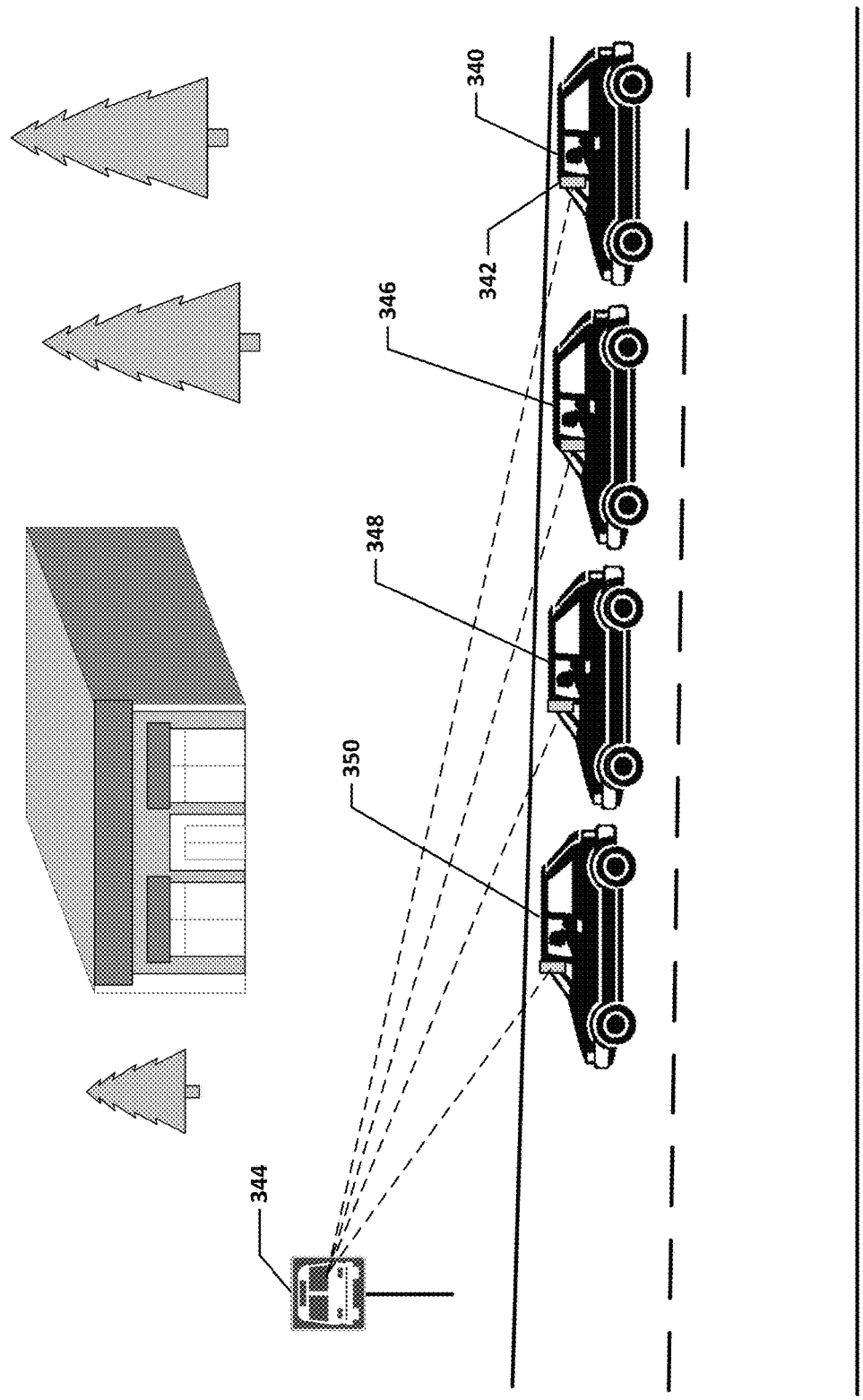
FIG. 18 illustrates an environment for the collection of image data for use in angular intensity profile analysis for an object.

In-motion imaging applications have the advantage of imaging an object from multiple viewpoints and, more importantly, multiple angles. Physical objects possess light-reflecting characteristics that, when sensed properly, can be utilized to categorize objects and even uniquely identify objects and their surface characteristics. FIG. 18 shows a vehicle 340 with a camera 342 on a roadway with an object 344 within the field of view of the camera 342. The location of the vehicle 340 is specified at T0 since it is the initial location of the vehicle 340 when the first image containing the object 344 is captured by the camera 342. Subsequent locations of the vehicle 340 are shown at T1 346, T2 348 and T3 350. The object 344 has a surface that is differentiable from other objects such that the same point on the surface of the object 344 can be identified and analyzed in images obtained from different locations and orientations relative to the object 344.

Figure 19:
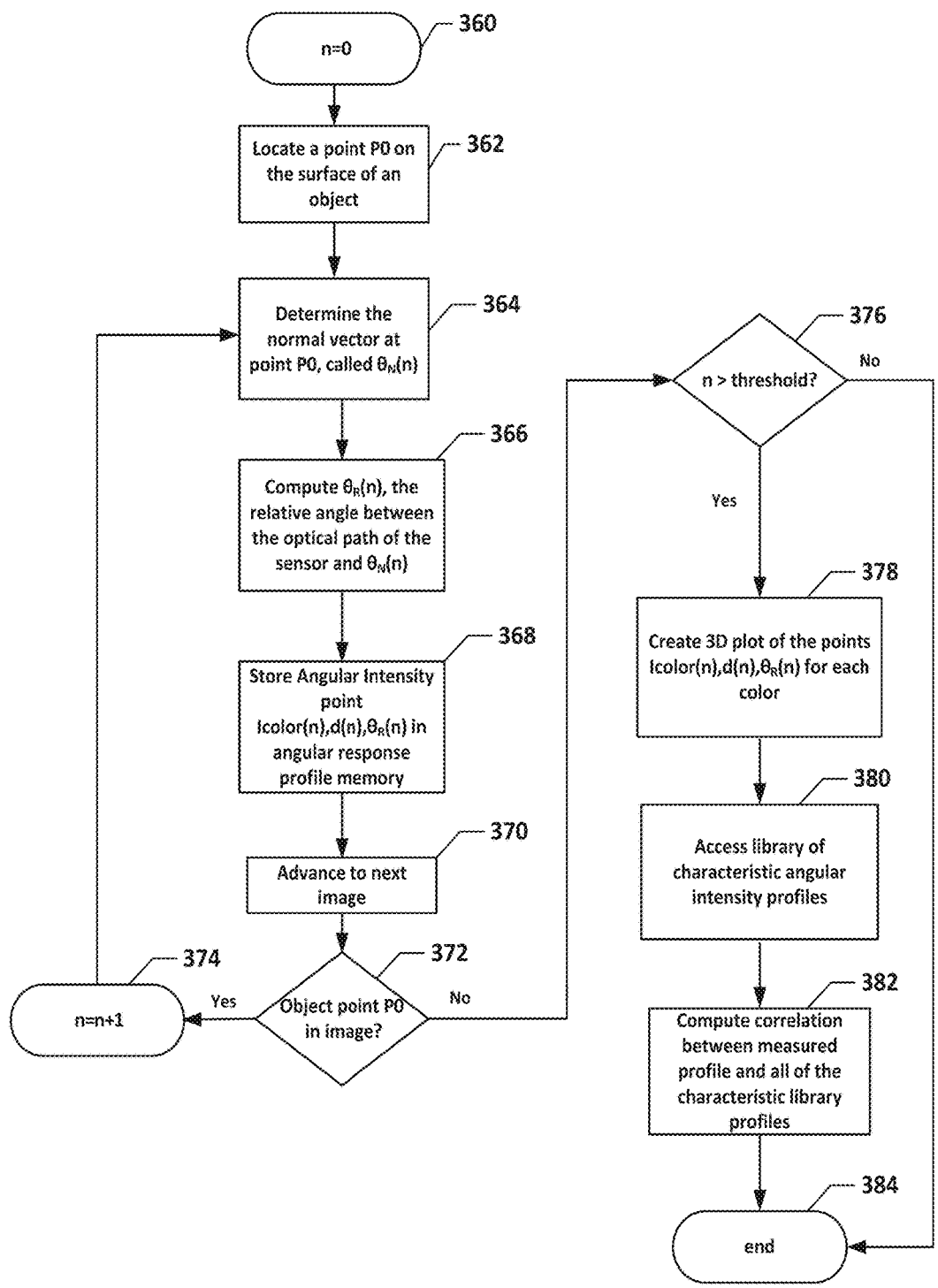
FIG. 19 illustrates the flow diagram for an algorithm that utilizes angular intensity profile analysis to classify or identify an object.

FIG. 19 shows a flow chart of the steps in the camera processing algorithm to obtain multi-angle information for an object point in the environment. A loop counter is utilized for each object that is processed and analyzed. The loop counter value n is initialized by assigning n=0 360 at the start of each object process. Image analysis software identifies a point P0 on the surface of an object 362 that will be analyzed for possible use in identifying the object using angular intensity profile analysis. Since point P0 is on the surface of an object the algorithm will compute the normal vector $\theta_N(n)$ for the surface 364 at point P0. Having established the normal vector, the processing algorithm will utilize scene geometry to compute $\theta_R(n)$, the relative angle 366 between the optical path of the sensor and the normal vector for the object at point P0. The angular intensity information for P0 is stored in the angular response profile memory 368 as a data element of the form $I_{color}(n), d(n), \theta_R(n)$, which specifies the intensity, distance and relative angle for sample n for point P0. For embodiments that utilize multiple colors for the detector filter array and/or emitter array each sample n will have a separate response profile memory entry for each color.

Upon completion of the processing for n=0 the processing algorithm obtains the next image 370 in a sequence. The image is analyzed to determine if point P0 is present 372 in the image. If P0 is present the loop counter is incremented 374 and the algorithm proceeds to the normal vector determination step 364. If P0 is not present the algorithm establishes whether there are enough points 376 to identify the object based on angular intensity characteristics. If the minimum requirements are not met the algorithm concludes 384 without identifying the object. If the minimum requirements are met the algorithm creates a plot in 3D space 378 for each color for the intensity information determined for all of the n points. The algorithm will define the object by comparing the collected angular intensity profile to reference characteristic profiles that are stored in a library. The characteristic profiles are retrieved from the library 380 and a correlation is determined 382 for each characteristic profile and the P0 profile. The characteristic profile with the highest correlation to P0 is used to determine the object type, class or feature for the object represented by P0.

The algorithm from FIG. 19 discusses a single point P0. For real-time object analysis the algorithm will typically be running simultaneously for multiple points Px in an image stream. Results from characteristic angular intensity profile analysis are typically passed to an upstream application for further processing and/or analysis or are packaged in an output data stream with image or depth map information to be sent to another device or application. The algorithm in FIG. 19 utilizes a threshold test to determine if sufficient information is collected to identify the object. Other tests are available and are utilized based on the information in the characteristic profiles. For example, a completeness check can analyze the range of $\theta_R(n)$ values for P0. If the range of values is too narrow the algorithm may discard P0 due to insufficient information to uniquely characterize the object. In other cases values of $\theta_R(n)$ for P0 may be too large and will not correlate to characteristic profiles. Including a $\theta_R(n)$ amplitude check as part of the threshold check allows the algorithm to discard profiles that will not yield reliable results in the characterization profile correlation.

In practice the library of characteristic angular intensity profiles will contain hundreds or possibly thousands of profiles. Performing correlations on all profiles in real-time is a computationally intensive operation. As a way of parsing the challenge to a more manageable size the analysis functionality on the device can perform image analysis to classify detected objects. Once classified, angular intensity profiles from the detected objects can be compared to only the library profiles that are associated with the identified object class. As an example, the image analysis functionality in a vehicle-mounted application can identify roadway surfaces based on characteristics such as coloration, flatness, orientation relative to the direction of travel, etc. Having established that a profile for a point P0 is classified as a roadway surface point, the algorithm can access only those characteristic profiles from the library that are classified as road surface characteristics. Some road surface characteristic profiles could include, but not be limited to:

Asphalt—smoothness rating A
Asphalt—smoothness rating B
Asphalt—smoothness rating C
Asphalt with surface moisture
Asphalt with surface ice
Concrete—smoothness rating A
Concrete—smoothness rating B
Concrete—smoothness rating C
Concrete with surface moisture
Concrete with surface ice An object like road signs is another profile class that can be separate in the profile library. Some road sign characteristic profiles could include, but not be limited to:

ASTM Type I
ASTM Type III
ASTM Type IV—manufacturer A
ASTM Type IV—manufacturer M
ASTM Type IV—manufacturer N
ASTM Type VIII—manufacturer A
ASTM Type VIII—manufacturer M
ASTM Type IX—manufacturer A
ASTM Type IX—manufacturer M
ASTM Type XI—manufacturer A
ASTM Type XI—manufacturer M The characteristic profile algorithm specifies correlation as the means to compare characteristic profiles and to select the most representative characteristic profile for the object represented by P0. Those reasonably skilled in the art can devise or utilize other methods to select the most representative characteristic profile based on the information collected and analyzed for the object represented by P0.

Figure 20:
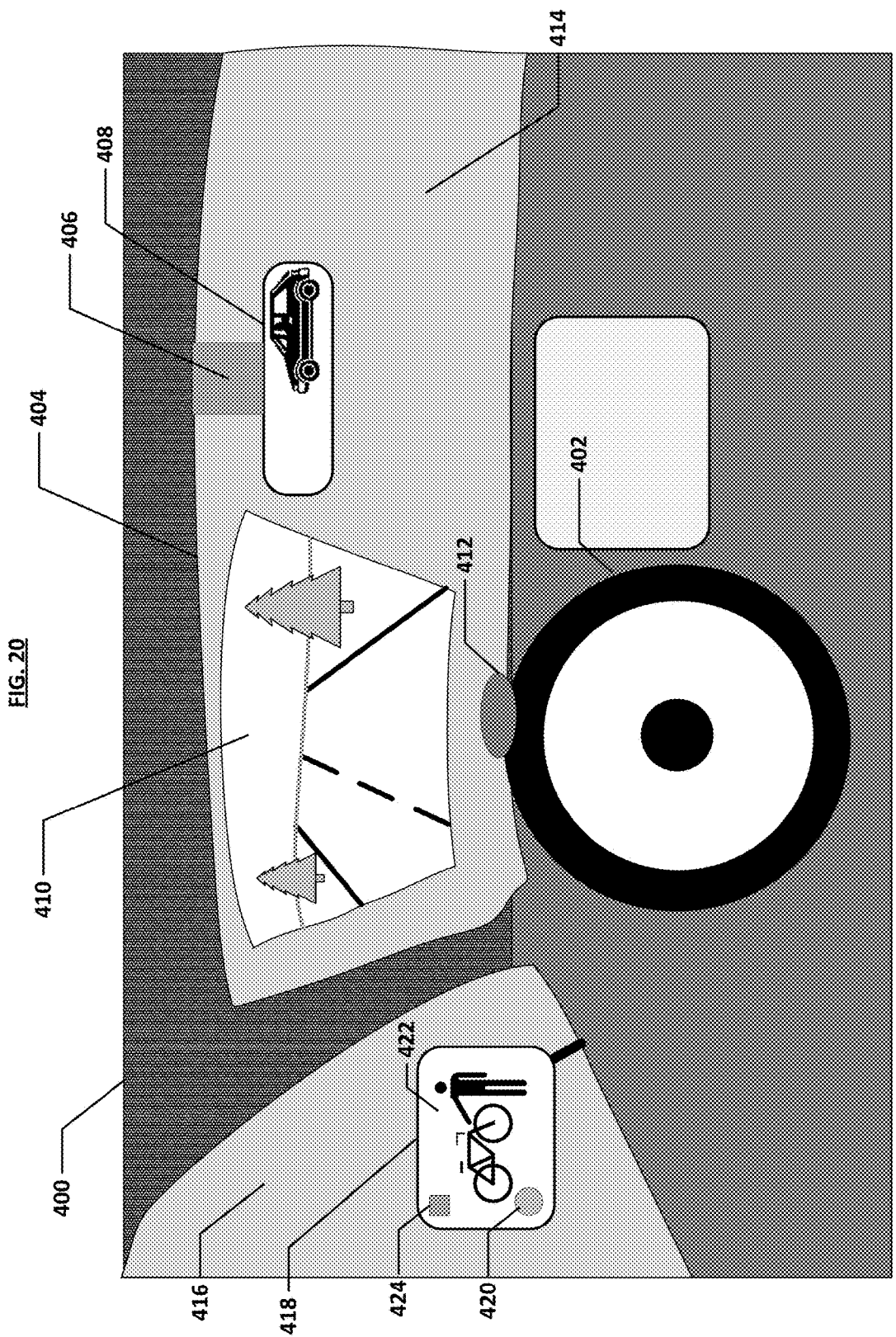
FIG. 20 illustrates an automotive configuration where cameras are used to provide information in low visibility conditions.

FIG. 20 shows a view from inside a passenger compartment of a vehicle 400. A steering wheel 402 is shown, although embodiments can be utilized in autonomous vehicles without steering wheels 402. Environmental conditions 414 outside the vehicle 400 produce low visibility due to phenomena like fog, rain, snow, sleet, dust. Alternately, or in addition, the see-through elements like the windshield 404 and the rear window (not shown) may have surface irregularities or coatings that limit the viewing of external conditions 414 from inside the vehicle 400. A front-facing camera 406 is mounted inside the vehicle 400 behind the windshield 404 near the rear-view mirror 408 to provide a forward-imaging view. The front-facing camera 406 control system detects an environmental condition for low visibility and projects 412 the image 410 onto the windshield 404 or other heads-up display feature to allow unobstructed viewing of the objects in the low-visibility environment.

The rear-view mirror 408 displays an unobstructed view from a rear-facing camera (not shown) that is in a rear-facing orientation mounted at the rear of the vehicle 400 or inside the vehicle 400 projecting through the rear window. Environmental 416 obstructions for the side of the vehicle 400 are addressed with features in the side mirror 418. A rear oblique-angle camera 420 detects obstructed environmental conditions 416 and projects an obstruction-free image 422 on the mirror for use by the vehicle 400 operator. Alternately, or in addition, the obstruction-free image 422 is delivered to the vehicle control system for autonomous or semi-autonomous driving systems. An indicator 424 on the side mirror indicates the presence of objects within a certain space, thus assisting the vehicle 400 operator in maneuvers like lane changes.

The other embodiments, the processing system can include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor or controller system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware that execute an operating system, system programs, and/or application programs, while also implementing the engine using multitasking, multithreading, distributed processing where appropriate, or other such techniques.

Accordingly, it will be understood that each processing system can be realized in a variety of physically realizable configurations, and should generally not be limited to any particular implementation exemplified herein, unless such limitations are expressly called out. In addition, a processing system can itself be composed of more than one engine, sub-engines, or sub-processing systems, each of which can be regarded as a processing system in its own right. Moreover, in the embodiments described herein, each of the various processing systems may correspond to a defined autonomous functionality; however, it should be understood that in other contemplated embodiments, each functionality can be distributed to more than one processing system. Likewise, in other contemplated embodiments, multiple defined functionalities may be implemented by a single processing system that performs those multiple functions, possibly alongside other functions, or distributed differently among a set of processing system than specifically illustrated in the examples herein.

Embodiments utilize high-speed components and circuitry whereby the relative movement of the device and/or scene could be defined as the movement of less than the inter-element spacing in the detector array. For embodiments wherein the relative movement is small the processing software can assume the axis of the 3D volumetric computations is normal to the detector elements in the array. For relative movement greater than the inter-element spacing in the detector array during the timeframe of the emitter cycles the frame buffer analysis software will need to perform 3D analysis of the sampled waveforms whereby the representations have an axis that is non-normal to the detector elements in the array.

The electrical circuitry of embodiments is described utilizing semiconductor nomenclature. In other embodiment circuitry and control logic that utilizes optical computing, quantum computing or similar miniaturized scalable computing platform may be used to perform part or all of the necessary high-speed logic, digital storage, and computing aspects of the systems described herein. The optical emitter elements are described utilizing fabricated semiconductor LED and laser diode nomenclature. In other embodiments the requirements for the various techniques described herein may be accomplished with the use of any controllable photon-emitting elements wherein the output frequency of the emitted photons is known or characterizable, is controllable with logic elements, and is of sufficient switching speed.

In some embodiments, the light energy or light packet is emitted and received as near-collimated, coherent, or wide-angle electromagnetic energy, such as common laser wavelengths of 650 nm, 905 nm or 1550 nm. In some embodiments, the light energy can be in the wavelength ranges of ultraviolet (UV)—100-400 nm, visible—400-700 nm, near infrared (NIR)—700-1400 nm, infrared (IR)—1400-8000 nm, long-wavelength IR (LWIR)—8 um-15 um, far IR (FIR)—15 um-1000 um, or terahertz—0.1 mm-1 mm. Various embodiments can provide increased device resolution, higher effective sampling rates and increased device range at these various wavelengths.

Detectors as utilized in the various embodiments refer to discrete devices or a focal plane array of devices that convert optical energy to electrical energy. Detectors as defined herein can take the form of PIN photodiodes, avalanche photodiodes, photodiodes operating at or near Geiger mode biasing, or any other devices that convert optical to electrical energy whereby the electrical output of the device is related to the rate at which target photons are impacting the surface of the detector.

Persons of ordinary skill in the relevant arts will recognize that embodiments may comprise fewer features than illustrated in any individual embodiment described above. The embodiments described herein are not meant to be an exhaustive presentation of the ways in which the various features of the embodiments may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. An active camera system configured to generate and present views of low-visibility objects on a vehicle display system inside a vehicle, comprising:
    at least one emitter configured to generate and emit light within a defined frequency range throughout a field of view of a scene that is in-motion relative to the vehicle;
    an array of detectors configured to receive light within the defined frequency range for a field of view of the array, the field of view of the scene defined by the field of view of the array of detectors;
    control circuitry operably coupled to the at least one emitter and the array of detectors and configured to:
    control a start time and a cycle duration of a detector integration for the array of detectors for each of the two or more frames, a start time of an emitter pulse sequence and an amount of timing overlap between a cycle duration of the emitter pulse sequence and the cycle duration of the detector integration; and
    produce at least two frames of image data of the scene to be stored in one or more frame buffers for which the amount of timing overlap between the emitter pulse sequence and the detector integration is different for each frame; and
    a processing system operably coupled to the control circuitry and the one or more frame buffers and configured to:
    correlate pixels for each of the at least two frames such that intensity values from common points in the scene are assigned to corresponding image pixels in an image of the scene; and
    display a plurality of images of the scene on the vehicle display device inside the vehicle such that one or more low-visibility objects are displayed based on the intensity values of image pixels in the scene corresponding to the one or more low-visibility objects.

2. The system of claim 1, wherein the vehicle display device is configured to project the images on a vehicle windshield inside the vehicle.

3. The system of claim 1, wherein the vehicle display device is configured to project the images on a heads-up display inside the vehicle.

4. The system of claim 1, wherein the vehicle display device is configured to project the images on a computer video display inside the vehicle.

5. The system of claim 1, wherein the intensity values from the images are communicated to an autonomous vehicle control system of the vehicle.

6. The system of claim 1, wherein the at least one emitter is inside the vehicle and emits light within the defined frequency range through one of a windshield or a window of the vehicle.

7. The system of claim 1, wherein the array of detectors is inside the vehicle and receives light within the defined frequency range through one of a windshield or a window of the vehicle.

8. The system of claim 1, wherein each detector in the array of detectors has an individual field of view that is a different subset of the field of view of the array of detectors.

9. A method of generating and displaying images of low-visibility objects on a vehicle display system inside a vehicle, comprising:
 causing at least one emitter to generate and emit light within a defined frequency range throughout a field of view of a scene that is in-motion relative to the vehicle;
 causing an array of detectors to receive light within the defined frequency range for a field of view of the array, the field of view of the scene defined by the field of view of the array of detectors;
 controlling a start time and a cycle duration of a detector integration for the array of detectors for each of the two or more frames, a start time of an emitter pulse sequence and an amount of timing overlap between a cycle duration of the emitter pulse sequence and the cycle duration of the detector integration;
 producing at least two frames of image data of the scene to be stored in one or more frame buffers for which the amount of timing overlap between the emitter pulse sequence and the detector integration is different for each frame; and
 utilizing a processing system operably coupled to the one or more frame buffers to:
 correlate pixels for each of the at least two frames such that intensity values from common points in the scene are assigned to corresponding image pixels in an image of the scene; and
 display a plurality of images of the scene on the vehicle display device inside the vehicle such that one or more low-visibility objects are displayed based on the intensity values of image pixels in the scene corresponding to the one or more low-visibility objects.

10. The method of claim 8, wherein the vehicle display device is configured to display the image of the scene by projecting the images on a vehicle windshield inside the vehicle.

11. The method of claim 8, wherein the vehicle display device is configured to display the images of the scene on a heads-up display inside the vehicle.

12. The method of claim 8, wherein the vehicle display device is configured to display the images of the scene on a computer video display inside the vehicle.

13. The method of claim 8, further comprising delivering the intensity values from the images to an autonomous vehicle control system of the vehicle.

14. The method of claim 8, wherein the at least one emitter is inside the vehicle and emits light within the defined frequency range through one of a windshield or a window of the vehicle.

15. The method of claim 8, wherein the array of detectors is inside the vehicle and receives light within the defined frequency range through one of a windshield or a window of the vehicle.

16. An active camera system configured to generate image data representing low-visibility objects viewed from a vehicle, comprising:
 at least one emitter configured to generate and emit light within a defined frequency range throughout a field of view of a scene that is in-motion relative to the vehicle;
 an array of detectors configured to receive light within the defined frequency range for a field of view of the array, the field of view of the scene defined by the field of view of the array of detectors;
 control circuitry operably coupled to the at least one emitter and the array of detectors and configured to:
 control a start time and a cycle duration of a detector integration for the array of detectors for each of the two or more frames, a start time of an emitter pulse sequence and an amount of timing overlap between a cycle duration of the emitter pulse sequence and the cycle duration of the detector integration; and
 produce at least two frames of image data of the scene to be stored in one or more frame buffers for which the amount of timing overlap between the emitter pulse sequence and the detector integration is different for each frame; and
 a processing system operably coupled to the control circuitry and the one or more frame buffers and configured to:
 correlate pixels for each of the at least two frames such that intensity values from common points in the scene are assigned to corresponding image pixels in an image of the scene; and
 deliver the image data to an autonomous vehicle control system within the vehicle such that one or more low-visibility objects are computer-analyzed based on the intensity values of image pixels in the scene corresponding to the one or more low-visibility objects.

17. The method of claim 16, wherein the at least one emitter is inside the vehicle and emits light within the defined frequency range through one of a windshield or a window of the vehicle.

18. The method of claim 16, wherein the array of detectors is inside the vehicle and receives light within the defined frequency range through one of a windshield or a window of the vehicle.

* * * * *